(12) United States Patent
Nishida et al.

(10) Patent No.: US 6,864,034 B2
(45) Date of Patent: Mar. 8, 2005

(54) TRANSFER MATERIAL TRANSFER PROCESS, SHAPE TRANSFER PROCESS AND TRANSFER DEVICE

(75) Inventors: Hiroyuki Nishida, Shizuoka-ken (JP); Keisuke Endo, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/702,476

(22) Filed: Nov. 7, 2003

(65) Prior Publication Data

US 2004/0142273 A1 Jul. 22, 2004

(30) Foreign Application Priority Data

| Nov. 8, 2002 | (JP) | ........................................ 2002-325147 |
| May 19, 2003 | (JP) | ........................................ 2003-140716 |
| Nov. 6, 2003 | (JP) | ........................................ 2003-376994 |

(51) Int. Cl.[7] ............................. G03F 7/34; B32B 3/04; B29C 35/08; B29C 55/00; B28B 17/00
(52) U.S. Cl. .................... 430/200; 156/234; 156/379.8; 156/380.9; 264/320; 264/402; 264/479; 264/481; 425/174.4; 425/373
(58) Field of Search ................................ 430/200, 201; 156/234, 379.8, 380.9; 264/402, 479, 481, 320; 425/174.4, 373

(56) References Cited

U.S. PATENT DOCUMENTS

| 4,569,806 | A | * | 2/1986 | Holster |
| 4,761,253 | A | * | 8/1988 | Antes |
| 5,756,249 | A | * | 5/1998 | Ellis |
| 6,027,850 | A | * | 2/2000 | Kawakami et al. |
| 6,221,553 | B1 | * | 4/2001 | Wolk et al. |
| 6,284,307 | B1 | * | 9/2001 | Fukuzawa et al. |
| 6,695,029 | B2 | * | 2/2004 | Phillips et al. |

FOREIGN PATENT DOCUMENTS

| JP | 2918037 B1 | 4/1999 |
| JP | 2000-221312 A | 8/2000 |
| JP | 2001-022210 A | 1/2001 |
| JP | 2001-130141 A | 5/2001 |
| WO | WO 00/41893 A1 | 7/2000 |

\* cited by examiner

Primary Examiner—Richard L. Schilling
(74) Attorney, Agent, or Firm—Birch, Stewart, Kolasch & Birch, LLP

(57) ABSTRACT

A transfer device in which a material which transmits a laser beam LB is employed as an upper mold, and a photothermal conversion layer is formed thereon. A transfer film, at which a transfer material layer is formed, and a workpiece are superposed and pressured between the upper mold and a lower mold. During this pressuring, the laser beam is irradiated in accordance with a pattern of an organic electroluminescent light-emitting layer that is to be formed on the workpiece. Thus, the photothermal conversion layer is heated and the transfer material layer is softened. As a result, the transfer material layer is cleaved and detached from a temporary support, and a component in the transfer material layer that is to form the organic electroluminescent light-emitting layer is transferred to the workpiece. Accordingly, efficient transfer processing is enabled when a transfer material is transferred to a transfer object by a thermal imaging process.

31 Claims, 21 Drawing Sheets

F I G. 9A
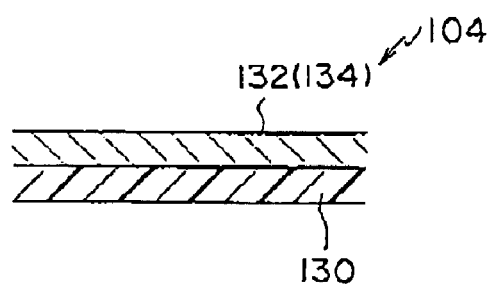
F I G. 9B
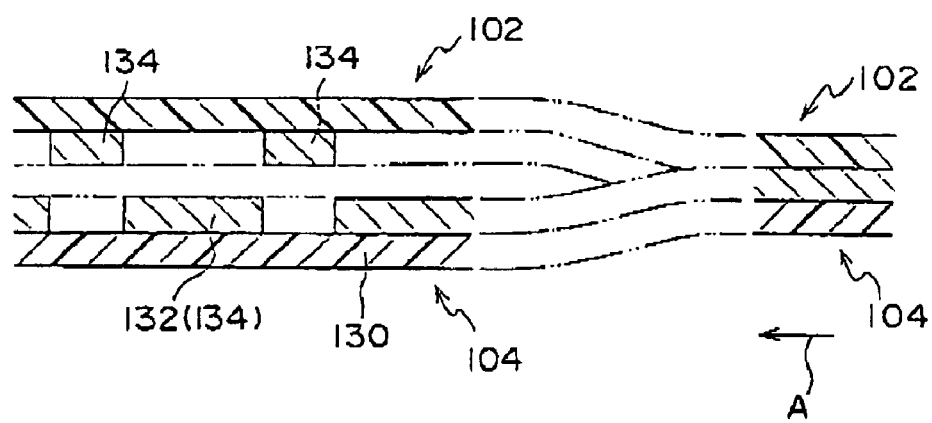

F I G. 15
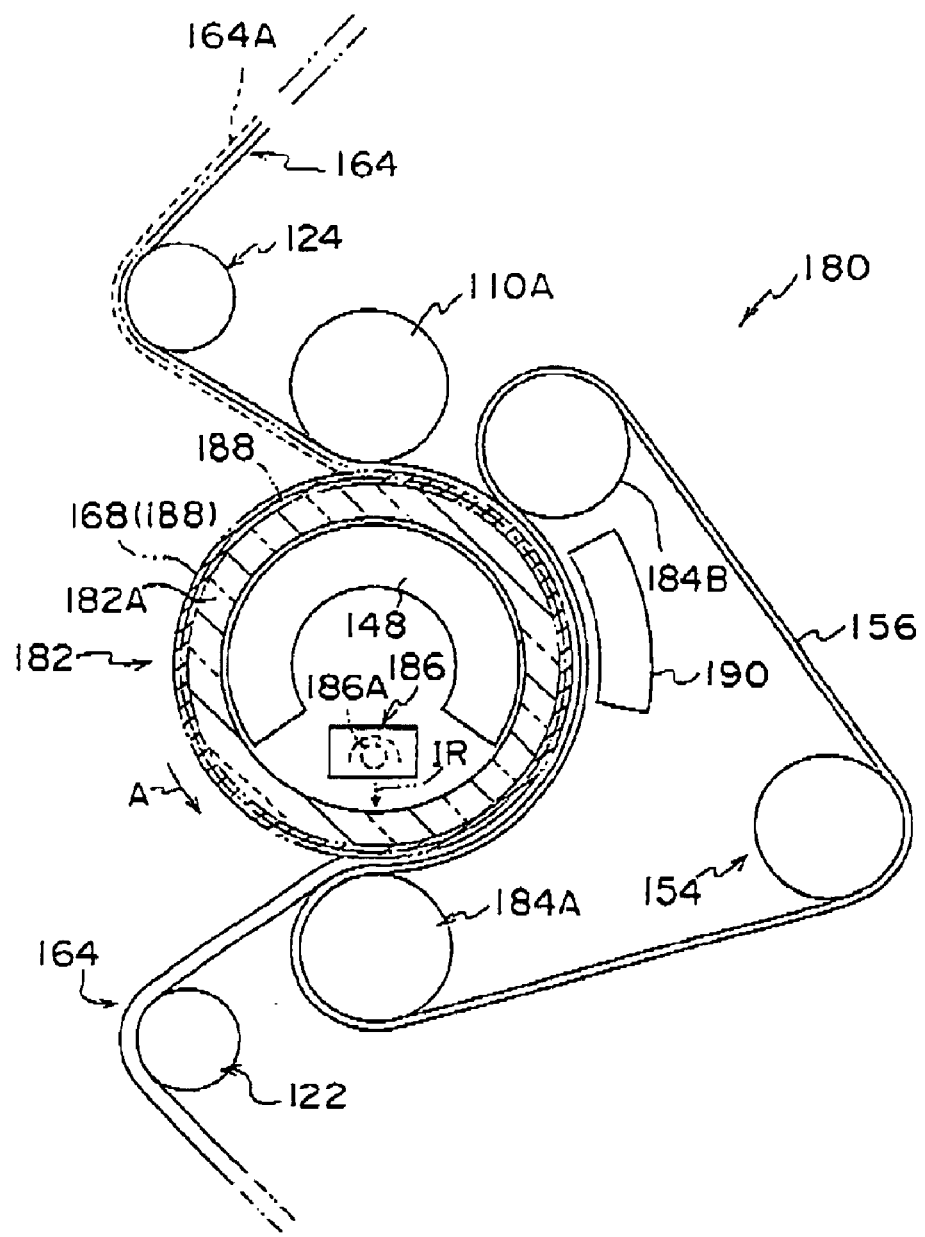

TRANSFER MATERIAL TRANSFER PROCESS, SHAPE TRANSFER PROCESS AND TRANSFER DEVICE

CROSS-REFERENCE TO RELATED APPLICATION

This application claims priority under 35 USC 119 from Japanese patent applications, No. 2002-325147, No. 2003-140716 and No. 2003-376994, the disclosures of which are incorporated by reference herein.

BACKGROUND OF THE INVENTION

1. Field of the Invention

The present invention relates to a transfer material transfer method, which transfers a transfer material to a transfer object using a thermal imaging process, to a shape transfer method, which forms recessed portions in a shape transfer object with a pattern corresponding to protruding portions which have been formed at a mold member, and to a transfer device.

2. Description of the Related Art

A molding method has been proposed in which, in a state in which an infra-red transmissive material is pressed against a plastic, radiation of infra-red rays is effected through the infra-red transmissive material and the plastic is heated by the irradiation of infra-red, whereby a surface shape of the infra-red transmissive material is thermally transferred to the plastic (see, for example, the Proceedings of the Thirteenth Annual Conference, from the Japan Society of Polymer Processing: "Kakouseikei '02", Special Session IV-103).

In this molding method, polymethyl methacrylate (PMMA), for example, is used as a transfer resin on which shape transfer is effected. A material such as zinc selenide or the like, which transmits carbon dioxide-laser light, is provided at a mold contacting one side of this PMMA, and silicon is disposed at a rear side face of the PMMA. In this state, the PMMA can be heated by irradiating a laser beam, and by further application of pressure, the PMMA can be processed to a shape corresponding to a metal mold.

The transfer resin can be instantaneously heated by using a laser beam in this manner, and can be cooled more rapidly than in a conventional heat-pressing process.

Meanwhile, a thermal imaging process which uses laser light (laser beams) has been proposed for forming separation ribs of color filters ("division patterns"), black matrices of liquid crystal display devices and the like (see, for example, Japanese Patent Application (JP-A) No. 2001-130141).

In this proposal, a donor sheet is employed in which a photothermal conversion layer and a transfer layer are provided on a backing material. The transfer layer includes an imaging component which is to be transferred to an image-receiving element. In a state in which the donor sheet and the image-receiving element are superposed, pressure is applied and a laser beam is irradiated onto the photothermal conversion layer. Hence, by fusing of the photothermal conversion layer, the transfer layer is detached from the backing material, and the transfer layer is transferred to the image-receiving element.

Organic light-emitting elements such as organic EL (electroluminescent) elements and the like are available as surface-type light sources such as full-color displays, backlights, illuminating light sources and the like, and array-type light sources for printers and the like. The thermal imaging process can also be employed for producing these organic electroluminescent elements.

An organic light-emitting element is structured by a light-emitting layer and a pair of opposing electrodes sandwiching the light-emitting layer. The light-emitting layer emits light when an electric field is generated between the pair of facing electrodes.

A method has been proposed in which, when such an organic electroluminescent element is to be produced, a donor sheet including an organic thin film and a photothermal conversion layer is employed. The organic thin film is thermally transferred by irradiation of a laser beam at the donor sheet (see, for example, the pamphlet of International Publication No. 00/41893).

Further, a method for producing a color organic display has been proposed in which: thin-walled protrusions whose interiors are hollow are formed at a metallic sheet; an organic electroluminescent light-emitting layer is vapor-deposited on the surface at which these protrusions are formed, such that an organic electroluminescent light-emitting layer is press-attached to a hole transport layer, which has been formed on a transparent conduction film; and, in this state, laser light is selectively irradiated at the protrusion interiors, as a result of which the organic electroluminescent light-emitting layer is transferred to the hole transport layer (See, for example, JP-B No. 2918037).

A shape transfer device which transfers a predetermined shaping to a surface of a continuous web has also been proposed. A stamper roll, at an outer peripheral face of which a mold is formed, is heated by heating means disposed to face the outer peripheral face. A resin original sheet, which is the web, is wound onto the heated stamper roll and pressure is applied thereto, as a result of which an embossed pattern is formed on the resin original sheet (see, for example, JP-A No. 2000-221312).

Further, there are methods for transferring a transfer material to a continuous web, such as a method in which a recording paper to which toner, which is a transfer material, has been applied is sandwiched by a thermal fixing roller and a pressurizing rubber roller. The toner is transferred to the recording paper by carrying out pressuring and heating processes (see, for example, JP-A No. 2001-22210).

In this proposal, an outer peripheral portion of the thermal fixing roller is formed with a translucent or light-transmissible base member, and a heat ray absorption layer is provided at a surface of this translucent base member. The heat ray absorption layer is heated by a halogen lamp disposed inside the heat ray fixing roller.

However, if a photothermal conversion layer, which generates heat when irradiated by a laser beam, is formed at a donor sheet together with a transfer material, there is a problem in that transfer materials which include components that are unfavorable for the photothermal conversion layer cannot be used. Moreover, below a temperature at which the photothermal conversion layer fuses, heat that is applied to the photothermal conversion layer is transmitted to the transfer material, and may break down components of the transfer material. Thus, formation of a photothermal conversion layer at a donor sheet may limit options of the types of transfer materials.

Further, because the laser beam is irradiated at the whole surface of the donor sheet, the temperature of transfer molds, which sandwich and pressurize the donor sheet and an image-receiving element therebetween, is also raised by the heat of this laser beam. In order to remove the donor sheet and the image-receiving element from the molds, it is necessary to cool the donor sheet and the image-receiving element. This causes a delay before the transfer material can be transferred to a subsequent image-receiving element, and is a hindrance to shortening of a transfer cycle.

When transferring a transfer material or shape to a web-form object of transfer, it is not necessarily the case that the transfer of material or transfer of shape has to be carried out over the whole face of the web. In such a case, heating the whole surface of the heating roller is extremely poor in terms of efficiency.

Further, the transfer object may be an item which is subject to thermal deformation when handled in a heated state. Further still, if a rise in temperature occurs before the heating roller faces a subsequent transfer object region, accurate heating control will be difficult. These points also make shortening of the transfer cycle difficult.

SUMMARY OF THE INVENTION

The present invention has been devised in light of the circumstances described above, and an object of the present invention is to provide a transfer material transfer method and shape transfer method which, when thermally transferring a transfer material to a transfer object and/or forming recessed portions with a predetermined pattern in a shape transfer object by a thermal imaging process, enable efficient heating and enable shortening of a work cycle of the material transfer or shape transfer.

In order to achieve the object described above, in a first aspect of the present invention, a transfer material transfer method for transferring a transfer material to a transfer object by superposing the transfer material with the transfer object and nipping and heating the superposed transfer material and transfer object between pressuring structures disposed in opposition includes the steps of: forming one of the pressuring structures of light-transmissive material; forming a photothermal conversion layer, which absorbs light emitted from a light source and generates heat, at a face of the one pressuring structure which is at the transfer material side thereof; pressuring the transfer object together with the transfer material between the opposing pressuring structures; and, during the step of pressuring, irradiating the light emitted from the light source to the photothermal conversion layer from the light-transmissive material side of the photothermal conversion layer, to heat the transfer material for transferring the transfer material to the transfer object.

In a second aspect of the present invention, a shape transfer method for forming recessed portions in a shape transfer object, the shape transfer object being nipped between pressuring structures disposed in opposition, a mold member being disposed between one of the pressuring structures and the shape transfer object, and the recessed portions being formed by a thermal transfer process in accordance with protruding portions of a predetermined pattern which are formed at the mold member, includes the steps of: forming the one pressuring structure of light-transmissive material which transmits light of a predetermined wavelength; forming a photothermal conversion layer, which generates heat when irradiated with light of the predetermined wavelength, at a face of the one pressuring structure which is at the shape transfer object side thereof; pressuring the shape transfer object between the opposing pressuring structures by the mold member; and, during the step of pressuring, irradiating light emitted from a light source to the photothermal conversion layer from the one pressuring structure side of the photothermal conversion layer for heating the photothermal conversion layer, heating the shape transfer object, and forming a pattern of the recessed portions in the shape transfer object in accordance with the protruding portions of the mold member.

According to the first and second aspects described above, when the transfer material and transfer object are pressured by the pair of pressuring structures or the transfer object is pressured by the mold member, one of these pressuring structures is formed of the light-transmissive material and is provided with the photothermal conversion layer. Thus, the photothermal conversion layer is heated by the light irradiated from the light source, and the transfer material and transfer object, or mold member and transfer object, are heated.

Accordingly, the transfer material and transfer object, or mold member and transfer object, can be efficiently heated while restraining a temperature increase of the pressuring structures. Further, a heat amount necessary for effecting the transfer in the pressuring structure can be made small. Thus, it is possible to shorten a transfer cycle, and efficient material transfer or shape transfer is enabled.

In a third aspect of the present invention, a transfer material transfer method for transferring a transfer material by a thermal transfer process, the transfer material being superposed with a transfer object and nipped between an upper side pressuring structure and a lower side pressuring structure, includes the steps of: forming the upper side pressuring structure of laser-transmissive material; forming a photothermal conversion layer, which is heated by laser light, at a face of the upper side pressuring structure which is at the transfer material side thereof; pressuring the transfer object together with the transfer material between the upper side pressuring structure and the lower side pressuring structure; and, during the step of pressuring, generating laser light from a laser oscillating structure and irradiating the laser light to the photothermal conversion layer, to heat the transfer material for transferring the transfer material to the transfer object.

According to the present aspect, the laser oscillating structure is employed as the light source. The upper side pressuring structure is formed of the material which transmits the laser light, and the photothermal conversion layer which absorbs the laser light and generates heat is provided at the upper side pressuring structure. Accordingly, the laser light generated by the laser oscillating structure irradiates the photothermal conversion layer, and heats the transfer material. As a result, the transfer material transfers to the transfer object.

Here, because heating and pressuring are used in combination for the transfer, and the transfer material is heated by the laser light being used to cause the photothermal conversion layer to generate heat, the transfer material can be heated efficiently. Further, because it is not necessary to raise the temperature by heating until the transfer material fuses, this process is efficient even if the transfer material and the like are materials whose characteristics vary greatly in accordance with temperature.

Further, because the photothermal conversion layer is provided at the upper side pressuring structure, components of the photothermal conversion layer are not subject to effects from components of the transfer material which is transferred to the transfer object. Therefore, transfer processing can be implemented using transfer materials with arbitrary components.

In the present aspect, it is preferable if a transfer material layer is formed of the transfer material at a temporary support, with the transfer material layer opposing the transfer object and the temporary support opposing the photothermal conversion layer of the upper side pressuring structure.

In a fourth aspect of the present invention, the step of irradiating the laser light includes irradiating the laser light from the laser oscillating structure to the photothermal conversion layer in correspondence with a pattern of the transfer material that is to be formed at a surface of the transfer object.

According to the present aspect, the laser light irradiated from the laser oscillating structure is irradiated in accordance with the pattern of the transfer material to be formed at the transfer object.

Accordingly, rather than heating the whole surface of the transfer material, it is possible to heat only required areas. Thus, even more efficient heating is possible. Furthermore, temperature increases of areas of the transfer material that do not require heating, of the transfer object, and of the upper side pressuring structure and the lower side pressuring structure can be restrained. Hence, the transfer cycle can be shortened.

In a fifth aspect of the present invention, a cooling structure is provided at least at the lower side pressuring structure, and preferably at both the upper side pressuring structure and the lower side pressuring structure.

According to the present aspect, cooling structures are provided at the lower side pressuring structure and possibly at the upper side pressuring structure. Accordingly, temperatures of the lower side pressuring structure, the upper side pressuring structure, the transfer material and the transfer object, which are raised as a result of the transfer of the transfer material to the transfer object, can be lowered.

If the transfer object is taken out from between the upper side pressuring structure and the lower side pressuring structure in a state in which the temperatures of the transfer object, the upper side and lower side pressuring structures and the like are high, transfer precision is adversely affected. Therefore, when the transfer material has been transferred to the transfer object, the transfer object must not be taken out until after the temperatures of the upper side pressuring structure, the lower side pressuring structure and, of course, the transfer object have fallen significantly.

In the present aspect, because the upper side pressuring structure and the lower side pressuring structure are cooled by the cooling structures, temperature rises of the upper side and lower side pressuring structures when the transfer material is heated can be restrained. Moreover, after the heating of the transfer material has been completed, the temperatures of the transfer material, the transfer object, the upper side pressuring structure and the lower side pressuring structure can be lowered rapidly.

Therefore, the transfer cycle can be greatly shortened without adversely affecting transfer precision.

In a sixth aspect of the present invention, protruding portions are formed at the transfer material side face of the upper side pressuring structure in correspondence with a pattern of the transfer material that is to be formed at a surface of the transfer object, and the step of generating and irradiating the laser light includes irradiating the laser light to the photothermal conversion layer that is disposed at the protruding portions.

According to the present aspect, the protruding portions are formed at the upper side pressuring structure to match the pattern of the transfer material which is transferred and formed on the transfer object. Thus, regions of the transfer object to which the transfer material is to be transferred are subject to pressuring.

Accordingly, pressure forces (pressure of the pressuring) and a transfer temperature (heating temperature) when the transfer material is transferred to the transfer object can be lowered. Thus, the transfer material can be transferred to the transfer object efficiently.

The upper side pressuring structure may be formed of quartz glass, and the photothermal conversion layer may be formed of nickel.

A material of the upper side pressuring structure is preferably selected in consideration of refractivity and, of course, transmittivity of the laser light. Further, transmittivity and refractivity of the laser light, absorptivity of the material employed for the photothermal conversion layer, and the like vary in accordance with wavelength of the laser light. Therefore, it is preferable for the material to be selected in consideration of the wavelength of the laser light.

In a seventh aspect of the present invention, a shape transfer method for forming recessed portions in a shape transfer object, the shape transfer object being nipped between an upper side pressuring structure and a lower side pressuring structure, and the recessed portions being formed by a thermal transfer process in accordance with protruding portions of a predetermined pattern, which are provided at a mold member which forms the upper side pressuring structure, includes the steps of: forming the mold member of light-transmissive material, which transmits light of a predetermined wavelength; forming a photothermal conversion layer, which generates heat when irradiated with light of the predetermined wavelength, at a face of the mold member which is at the shape transfer object side thereof; pressuring the shape transfer object together with the transfer material between the upper side pressuring structure and the lower side pressuring structure; and, during the step of pressuring, irradiating the light of the predetermined wavelength from a light source, which is disposed to face the mold member, for heating the photothermal conversion layer, heating the shape transfer object, and forming a pattern of the recessed portions in the shape transfer object in accordance with the protruding portions of the mold member.

According to the present aspect, one of the pressuring structures, at which the mold member used for shape transfer is formed or disposed, is formed by the material which transmits the light of the predetermined wavelength emitted from the light source. The photothermal conversion layer, which absorbs this light and generates heat, is provided at the shape transfer object side face of this pressuring structure. While the shape transfer object is being pressured, the protruding portions of the mold member which are in contact with the shape transfer object are heated by the light emitted from the light source.

Hence, by heating and softening the shape transfer object, the pattern of recessed portions corresponding to the pattern of protruding portions of the mold member can be formed at the shape transfer object.

Here, because the shape transfer object is only partially heated, a temperature increase of the shape transfer object is restrained, and the shape transfer can be carried out efficiently.

In a shape transfer method based on the present aspect, a thermal light source which emits near infra-red rays may be employed as the light source.

Further, in a shape transfer method based on the present aspect, a laser oscillating structure which emits a laser beam of a predetermined wavelength may be employed as the light source. In such a case, when the laser oscillating structure irradiates the laser beam toward the protruding portions formed at the mold member, only the protruding portions of the mold member that are in contact with the transfer object are heated. Thus, efficient heating of the mold member and the shape transfer object is possible.

Further still, in a shape transfer method based on the present aspect, a cooling structure is provided at least at the lower side pressuring structure, and preferably at both the upper side pressuring structure and the lower side pressuring structure.

Accordingly, a temperature rise of the shape transfer object can be restrained, and rapid cooling of the shape transfer object, the upper side pressuring structure and the lower side pressuring structure is possible. Thus, shortening of a shape transfer cycle becomes possible.

Herein, the upper side pressuring structure, of the pair of pressuring structures, represents the structure that is at the side at which laser light emitted from a laser oscillating structure or light emitted from a thermal light source is illuminated, and is not necessarily limited to an upper side in a vertical direction. For example, if pressuring structures corresponding to the upper side pressuring structure and the lower side pressuring structure are disposed to oppose along a horizontal direction, whichever is illuminated by laser light or light from a thermal light source is the upper side pressuring structure. That is, in the present invention, of the pressuring structures disposed in opposition, whichever is illuminated by laser light, infra-red rays or the like is referred to as the upper side pressuring structure.

In an eighth aspect of the present invention, a transfer material transfer method for transferring a transfer material to a web-form transfer object by superposing, heating and pressuring the transfer material with the transfer object includes the steps of: providing a photothermal conversion layer, which absorbs light irradiated from a light source and generates heat, at an outer peripheral face of a transfer roller which is formed in a cylindrical shape, light-transmissive material being used as a base member of an outer peripheral portion of the transfer roller; superposing the transfer object with the transfer material; winding the superposed transfer object round the photothermal conversion layer; conveying the superposed and wound transfer object; during the step of conveying, pressuring the transfer object together with the transfer material between the transfer roller and a pressure roller; during the step of pressuring, irradiating light emitted from a light source, which is provided at an interior of the transfer roller, toward the photothermal conversion layer for heating the photothermal conversion layer in accordance with a pattern of the transfer material that is to be transferred to the transfer object; and allowing the heated photothermal conversion layer to heat the transfer material for transferring the transfer material to the transfer object.

According to the present aspect, the transfer material and transfer object are superposed and wound around at the transfer roller, which is formed by the light-transmissive material in the cylindrical shape, and nipped between the transfer roller and the pressure roller. Further, the light source is disposed at the interior of the transfer roller, and the photothermal conversion layer is disposed between the transfer material and the base member of the transfer roller.

The light source irradiates the light of the predetermined wavelength in accordance with the pattern of the transfer material that is to be transferred to the transfer object. This light is transmitted through the base member and absorbed at the photothermal conversion layer, and heats the photothermal conversion layer. The transfer material is heated in accordance with this transfer pattern, and the transfer material is transferred to the transfer object.

According to the present aspect, whole faces of the transfer object and the like are not heated. Therefore, temperature rises of the transfer object and the like can be restrained. Thus, the transfer material can be heated and transferred to the transfer object efficiently.

Further, a temperature rise of the transfer object and a temperature rise of the transfer roller can be restrained. Hence, a cooling time of the transfer object can be shortened. Correspondingly, the transfer cycle can be shortened, and an improvement in productivity when the transfer material is being continuously transferred to the web-form transfer object can be expected.

In the present aspect, in a case in which the light source emits laser light, it suffices if the outer peripheral portion of the transfer roller is formed of laser-transmissive material and the photothermal conversion layer is formed of laser-adsorbing material.

In the ninth aspect of the present invention, a transfer material transfer method for transferring a transfer material to a web-form transfer object by superposing, heating and pressuring the transfer material with the transfer object, comprises the steps of: providing a photothermal conversion layer, which absorbs light irradiated from a light source and generates heat, at one face of a web-forming support member formed of a light-transmissive flexible member; superposing the transfer material with the photothermal conversion layer side face of the support member; superposing the transfer object with the transfer material; winding the transfer object superposed with the transfer material around a winding roller; conveying the superposed and wound transfer object; during the step of conveying, pressuring the transfer object superposed with the transfer material between the support member and the winding roller by pressuring with a pressuring structure; during the step of pressuring, irradiating light emitted from a light source toward the photothermal conversion layer provided at the support member for heating the photothermal conversion layer in accordance with a transfer pattern; and allowing the heated photothermal conversion layer to heat the transfer material for transferring the transfer material to the transfer object.

In the present aspect, a photothermal conversion layer is provided at one face of a web-form support member formed of a light-transmissive flexible member. A transfer material is positioned to face the photothermal conversion layer. A transfer object is superposed with the transfer material. In such a state, the transfer object is wound around a winding roller and conveyed. When the transfer material is to be transferred to the transfer object, light is irradiated in accordance with a transfer pattern, from the other face of the supporting member which is at a side opposite to the photothermal conversion layer.

Accordingly, in the present aspect, the transfer material can be efficiently heated and transferred to the transfer object. Such an efficient transfer of the transfer material is possible because it is unnecessary to heat the whole surface of the transfer object.

In the transfer material transfer method of the present aspect, laser light can be irradiated from the light source toward the photothermal conversion layer of the supporting member, with effecting scanning in accordance with the transfer pattern. Accordingly, the transfer material can be transferred to the transfer object in any desired transfer pattern.

In a tenth aspect of the present invention, a shape transfer method for forming recessed portions with a predetermined pattern in a surface of a web-form transfer object by heating and pressuring the transfer object includes the steps of: providing a photothermal conversion layer, which absorbs light irradiated from a light source and generates heat, at an outer peripheral face of a transfer roller which is formed in a substantially cylindrical shape, light-transmissive material being used as a base member of an outer peripheral portion of the transfer roller; providing a mold member, at which protruding portions corresponding to the recessed portions to be formed in the surface of the transfer object are formed, at the outer peripheral face of the transfer roller; winding the transfer object around the transfer roller; conveying the wound transfer object; during conveying, pressuring the transfer object between the transfer roller and a pressure roller; during pressuring, irradiating light from a light source, which is provided at an interior of the transfer roller, toward the photothermal conversion layer for heating the photothermal conversion layer and heating the transfer object via the protruding portions formed at the mold member; and, consequent to the heating, forming the recessed portions in the transfer object in accordance with the protruding portions.

According to the present aspect, the web-form transfer object is wound on at the transfer roller and is pressed by the pressuring structure, which employs the pressure roller. At this time, the photothermal conversion layer and the mold member are disposed between the base member of the transfer roller and the transfer object.

The photothermal conversion layer absorbs the light of the predetermined wavelength, which is irradiated toward the transfer object from the light source, generates heat and heats the mold member.

At this time, the transfer object is principally heated by receiving heat from the protruding portions formed at the mold member. Hence, the recessed portions are formed in accordance with the pattern of protruding portions. Further, because the base member of the transfer roller transmits the light, heat amounts for heating the mold member can be kept small, and temperature rises of the transfer roller are restrained.

As a result, high efficiency transfer is possible, the transfer cycle is shortened, and an improvement in productivity when the transfer material is being continuously transferred to the web-form transfer object can be expected.

In the present aspect, in a case in which the light source generates laser light, the outer peripheral portion of the transfer roller is formed of laser-transmissive material and the photothermal conversion layer is formed of laser-absorbing material. Further, this structure enables selective illumination of the laser light at the protruding portions. Thus, a further improvement in transfer efficiency can be expected.

In an eleventh aspect of the present invention, a transfer device for transferring a transfer material to a web-form transfer object in a predetermined transfer pattern by superposing, heating and pressuring the transfer material with the transfer object includes: a transfer roller around which the transfer material and the transfer object are wound and conveyed, a base member of an outer peripheral portion of the transfer roller being formed in a cylindrical shape of a light-transmissive material which transmits light of a predetermined wavelength; a photothermal conversion layer disposed between an outer peripheral face of the transfer roller and the transfer object that is wound around the transfer roller, the photothermal conversion layer absorbing light of the predetermined wavelength for generating heat; a pressuring structure which applies pressure by nipping the transfer object between the pressuring structure and the transfer roller; and a light source disposed at an interior of the transfer roller, which heats the photothermal conversion layer in accordance with the transfer pattern by irradiating light of the predetermined wavelength toward the transfer object that is being pressured by the pressuring structure, for heating the transfer material.

That is, in a transfer device of the present aspect, the transfer material and the transfer object are wound on and pressured at the transfer roller, which is formed of the light-transmissive base member in the cylindrical form. At this time, the photothermal conversion layer is disposed between the transfer roller and the transfer material, and the light is illuminated toward this photothermal conversion layer on the basis of the transfer pattern of the transfer material.

As a result, the transfer material is heated and transferred to the transfer object in accordance with the transfer pattern.

In the present aspect, the photothermal conversion layer may be formed at the outer peripheral face of the transfer roller.

In a twelfth aspect of the present invention, a transfer device for forming recessed portions in a surface of a web-form transfer object by superposing, heating and pressuring a mold member with the transfer object, protruding portions of a predetermined pattern being formed at the mold member and the recessed portions being formed in accordance with the protruding portions, includes: a transfer roller around which the transfer object is wound and conveyed, a base member of an outer peripheral portion of the transfer roller being formed in a cylindrical shape of a light-transmissive material which transmits light of a predetermined wavelength; a photothermal conversion layer formed between an outer peripheral face of the transfer roller and the transfer object that is wound around the transfer roller, the photothermal conversion layer absorbing light of the predetermined wavelength for generating heat; a pressuring structure which applies pressure by superposing and nipping the transfer object with the mold member between the pressuring structure and the transfer roller; and a light source disposed at an interior of the transfer roller, which heats the photothermal conversion layer by irradiating light of the predetermined wavelength toward the transfer object that is being pressured by the pressuring structure, for heating the transfer object by heating the protruding portions of the mold member.

In the present aspect, the transfer object is wound on and pressured at the transfer roller, which is formed by the light-transmissive base member in the cylindrical form. At this time, the mold member, at which the protruding portions are formed in accordance with the recessed portions to be formed at the transfer object, and the photothermal conversion layer are disposed between the transfer roller and the transfer object. The light of the predetermined wavelength is illuminated from the light source toward the photothermal conversion layer. Hence, the transfer object is heated principally by the protruding portions formed at the mold member.

Thus, the transfer object can be heated without heating the whole surface of the transfer object, and the recessed portions corresponding to the protruding portions of the mold member can be formed at the transfer object continuously.

In the present aspect, the mold member may be formed integrally at the outer peripheral portion of the transfer roller, or the mold member may be formed as a web, superposed with the transfer object and wound onto the transfer roller, and conveyed.

Furthermore, in the present aspect, in a case in which the light source generates laser light, the base member of the transfer roller may be formed of laser-transmissive material and the photothermal conversion layer may be formed of laser-absorbing material.

In such a case, it is preferable if a transfer device based on the present aspect is capable of illuminating the laser light from the light source selectively at the respective protruding portions. That is, by scanning and illuminating the laser light in accordance with the pattern of the recessed portions to be formed at the transfer object, more efficient heating is possible.

Further still, in a transfer object based on the present aspect, the laser light may be illuminatable to arbitrary positions along a direction intersecting the conveyance direction of the transfer object, from a laser head provided with a plurality of emission apertures which are respectively capable of illuminating the laser light therefrom. Further, an endless pressure belt which is wound around a predetermined range of the transfer roller may be provided to serve as the pressuring structure.

Further yet, in a transfer device based on the present aspect, it is preferable that a cooling structure which cools the heated transfer object is provided in a peripheral neighborhood of the transfer roller.

In a thirteenth aspect of the present invention, a transfer device for transferring a transfer material to a web-form transfer object in a predetermined transfer pattern by superposing, heating and pressuring the transfer material with the transfer object, the device comprises: a heat generation member including a photothermal conversion layer provided at one face of a support member which is formed in web form of a light-transmissive flexible member, the support member transmitting laser light of a predetermined wavelength, and the photothermal conversion layer absorbing laser light and generating heat; a winding roller around which the transfer object is wound and conveyed, the heat generation member and the transfer material superposed with the transfer object being wound around the winding roller such that the support member side of the heat generation member is at an outer side; a pressuring structure which applies pressure to the transfer material and the transfer object by pressuring the heat generation member, which is wound around the winding roller, toward the winding roller; and a light source which heats the photothermal conversion layer in accordance with the transfer pattern, by irradiating laser light toward the heat generation member that is wound around the winding roller together with the transfer object and the transfer material, for heating the transfer material.

In the present aspect, the transfer material superposed with the transfer object is wound around the winding roller and conveyed. The heat generation member includes the support member which is formed in web form, of a light-transmissive flexible member, and the photothermal conversion layer provided at one side of the supporting member. The heat generating member is wound around the winding roller such that the photothermal conversion layer faces the transfer material.

When the transfer material is to be transferred to the transfer object, light emitted from the light source is irradiated on the photothermal conversion layer from the supporting member side, in accordance with a transfer pattern. As a result, the photothermal conversion layer generates heat for heating the transfer material and transferring the heated transfer material to the transfer object.

In the transfer device of the present aspect, the light source is preferably of a type which effects irradiation with scanning the laser light in accordance with the transfer pattern. Further, the transfer device may include a cooling structure which cools an outer peripheral portion of the winding roller.

As a result, in the present aspect, the transfer material can be transferred, in any desired transfer pattern, to the web-form transfer object.

BRIEF DESCRIPTION OF THE DRAWINGS

FIG. 9A is a schematic sectional view of a donor film employed in the fifth embodiment.

FIG. 9B is a schematic view showing transfer of a transfer material from the donor film to a workpiece film.

FIG. 15 is a schematic sectional view of a shape transfer device employed in a seventh embodiment.

DETAILED DESCRIPTION OF THE INVENTION

Herebelow, embodiments of the present invention will be described.

First Embodiment

Figure 1:
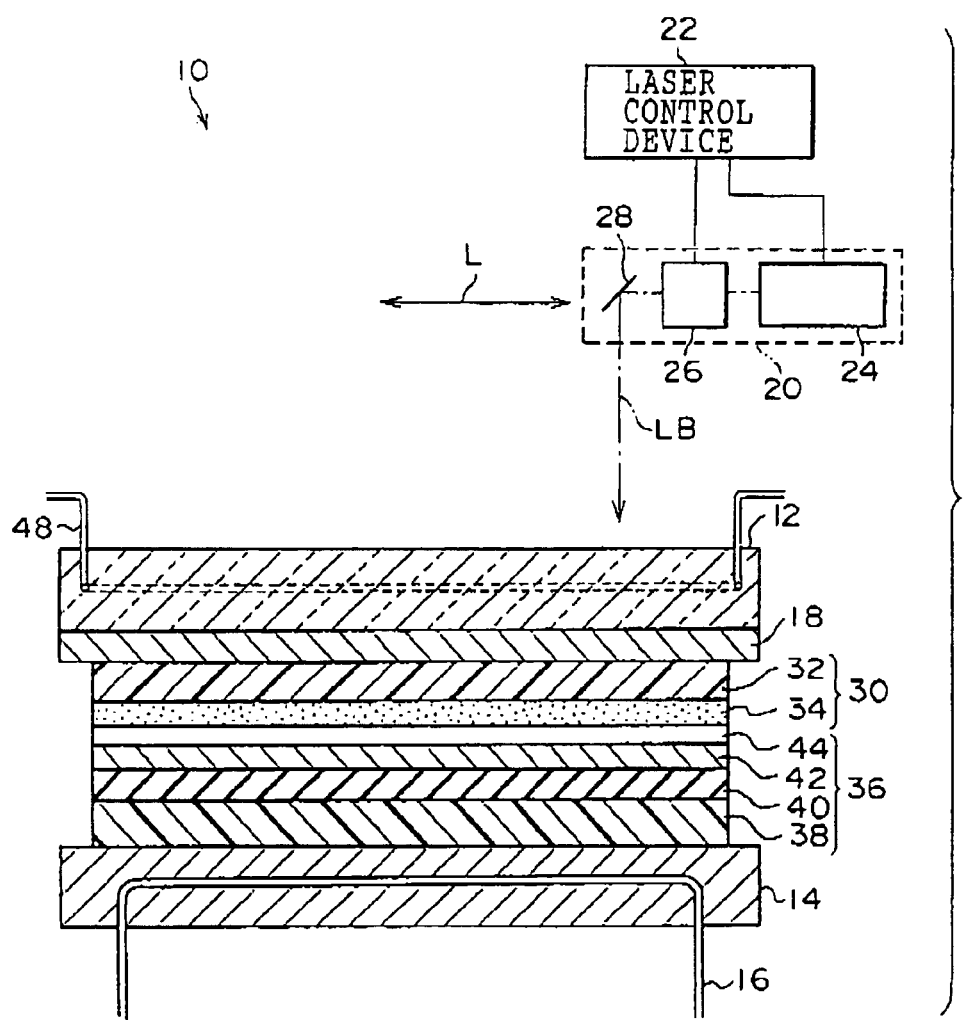
FIG. 1 is a schematic sectional view of a transfer device employed in a first embodiment.

FIG. 1 shows general structure of a transfer device 10 employed in a first embodiment of the present invention. This transfer device 10 superposes a donor sheet, at which a transfer material is provided, with an object of transfer, and implements image transfer to this transfer object by a thermal imaging process. In the present embodiment, as an example, the transfer device 10 is used to form organic electroluminescent elements, which are formed by laminating a transparent electrode, a hole transport layer, a light-emitting layer, an electron transport layer and a metallic electrode on a glass substrate.

The transfer device 10 is equipped with an upper mold 12, at which an upper side pressuring structure is formed, and a lower mold 14, at which a lower side pressuring structure is formed. In a state in which the donor sheet and the transfer object are superposed between the upper mold 12 and the lower mold 14, the upper mold 12 and the lower mold 14 apply pressure to the donor sheet and the transfer object by nipping with a predetermined pressure force.

A conventionally known ordinary material may be utilized as the lower mold 14. Further, cooling piping 16 is provided at the lower mold 14 to serve as a cooling structure. This cooling piping 16 circulates a coolant such as cooling water or the like at a predetermined temperature (for example, 10° C. to 20° C.). As a result, the lower mold 14 of the transfer device 10 is maintained at a predetermined temperature (the temperature of the cooling water), and temperature rises of the lower mold 14 are prevented.

Note that the coolant is not limited to cooling water, and a freely selected liquid or gas may be employed. Further, the cooling structure is not limited to the cooling piping 16. A freely selected structure can be employed as long as temperature rises of the lower mold 14 are prevented and the structure maintains a predetermined temperature, such as by blowing cooling air onto the lower mold 14 or the like.

The upper mold 12 is formed using quartz glass, ZnSe or the like, which transmits a later-described laser beam. A photothermal conversion layer 18 is provided at a face of the upper mold 12 which is at the lower mold 14 side thereof. This photothermal conversion layer 18 is formed by, for example, nickel (Ni) vapor deposition to a thickness of around 0.4 $\mu$m. When the photothermal conversion layer 18 is irradiated by the laser beam, the photothermal conversion layer 18 absorbs the energy of the laser beam and generates heat at a region irradiated by the laser beam.

A heating head 20 and a laser control device 22 are also provided at the transfer device 10. The heating head 20 is equipped with a laser oscillator 24, a beam polarizer 26 including an unillustrated condensing lens, and a reflection mirror 28. The heating head 20 emits a laser beam LB which is generated at the laser oscillator 24.

The reflection mirror 28 reflects the laser beam LB, which has been generated at the laser oscillator 24 and transmitted through the beam polarizer 26, toward the upper mold 12. Hence, the laser beam LB is irradiated to the upper mold 12. Note that although the laser beam LB that has passed through the beam polarizer 26 is reflected toward the upper mold 12 by the reflection mirror 28 in the present embodiment, the heating head 20 is not limited thus; the laser beam LB that has passed through the beam polarizer 26 could be irradiated to the upper mold 12 directly.

The laser oscillator 24 that is employed in the present embodiment uses a semiconductor laser to generate the laser beam LB at a predetermined wavelength in accordance with driving signals inputted from the laser control device 22.

The beam polarizer 26 is equipped with, for example, an AOD (acousto-optical device), condenses the laser beam LB emitted from the laser oscillator 24, and focuses the laser beam LB to a spot with a prescribed diameter at a prescribed position of the upper mold 12.

An unillustrated moving structure is also provided at the transfer device 10, integrally with the upper mold 12 and the lower mold 14. The moving structure is formed by, for example, an X-Y table which moves in a paper front-rear direction of FIG. 1 and a left-right direction of the same (the direction of arrow L and a direction intersecting the direction of arrow L).

Accordingly, the heating head 20 moves relatively with respect to the upper mold 12, and laser beam LB emission apertures of the heating head 20 can oppose freely selected positions of the upper mold 12.

The laser control device 22 switches the laser oscillator 24 on and off (pulse driving) synchronously with movement of this unillustrated moving structure. Thus, the laser beam LB can irradiate freely selected positions of the upper mold 12.

When the laser beam LB is irradiated to the upper mold 12, the laser beam LB is transmitted through the upper mold 12. The upper mold 12 is formed in a substantially rectangular block shape, and the laser beam LB is irradiated perpendicularly thereto. Accordingly, absorption of the laser beam LB in the upper mold 12 is restrained, and the laser beam LB is efficiently irradiated to the photothermal conversion layer 18. The beam polarizer 26 adjusts a focusing point of the laser beam LB to a prescribed spot diameter at the photothermal conversion layer 18.

The photothermal conversion layer 18 is formed of a material with high absorptivity with respect to the laser beam LB. Accordingly, when the laser beam LB is irradiated thereto, the energy of the laser beam LB is absorbed and the position irradiated by the laser beam LB generates heat.

In the present embodiment, a transfer film 30 is employed as the donor sheet. This transfer film 30 is formed by a temporary support 32 and a transfer material layer 34, which is provided at one face of the temporary support 32.

The temporary support 32 is formed as a thin sheet with a thickness of 5 $\mu$m, using, for example, a flexible material which is chemically and thermally stable. Polyethylene terephthalate (PET), polyether sulfone (PES) or the like can be used for this temporary support 32.

The temporary support 32 may employ a fluorine resin such as a tetrafluoroethylene resin (PTFE), a chlorotrifluoroethylene resin (PCTFE) or the like; a polyester such as polyethylene naphthalate (PEN) or the like; a polyolefin such as a polyate, polycarbonate, polyethylene, polypropylene or the like; or the like; or a laminate of these. A thickness of the temporary support 32 is 1 $\mu$m to 300 $\mu$m, preferably 3 $\mu$m to 200 $\mu$m, and more preferably 3 $\mu$m to 50 $\mu$m.

The transfer material layer 34 includes a component which will become the light-emitting layer of the aforementioned organic electroluminescent element (i.e., an organic electroluminescent light-emitting layer), with a thickness of 60 nm. A thickness of the transfer material layer 34 is preferably from 10 nm to 200 nm, and more preferably from 20 nm to 80 nm.

The transfer material layer 34 is softened by heating due to the generation of heat by the photothermal conversion layer 18, can be easily detached from the temporary support 32, and is easily cleaved at faces bordering non-heated portions. Here, because the transfer film 30 is being pressed against the transfer object, a component of the transfer material layer 34 is transferred to the transfer object.

In the present embodiment, a heating temperature of the transfer material layer 34 due to the photothermal conversion layer 18 generating heat when irradiated by the laser beam LB is from 40° C. to 250° C., preferably from 50° C. to 200° C., and more preferably from 60° C. to 180° C.

For the transfer material layer 34, a glass transition temperature of components thereof is preferably not less than 40° C. and not more than the transfer temperature plus 40° C., is more preferably at least 50° C. and at most the transfer temperature plus 20° C., and is particularly preferably at least 60° C. and at most the transfer temperature. Further, a flowing temperature of an organic thin film layer in the transfer material layer 34 (the organic electroluminescent light-emitting layer), or of a component thereof, is preferably not less than 40° C. and not more than the transfer temperature plus 40° C., more preferably at least 50° C. and at most the transfer temperature plus 20° C., and particularly preferably at least 60° C. and at most the transfer temperature.

A workpiece 36, which is the transfer object, is formed by laminating an insulating layer 40, a cathode layer 42 and an electron transport layer 44 on a substrate which employs polyimide or the like (below referred to as a "PI substrate 38"). The insulating layer 40 also functions as a hard coat layer and a smooth layer, and the cathode layer 42 will become a metallic electrode of the organic electroluminescent element.

The cathode layer 42 is, for example, a vapor deposition layer with a thickness of 180 nm formed by aluminum vapor deposition. The electron transport layer 44 is formed to a thickness of, for example, 40 nm.

In the transfer device 10, the workpiece 36 and the transfer film 30 are superposed in a state in which the electron transport layer 44 of the workpiece 36 and the transfer material layer 34 of the transfer film 30 are opposed, and are disposed between the upper mold 12 and the lower mold 14. While the electron transport layer 44 and the transfer material layer 34 are pressured by a predetermined pressure applied between the upper mold 12 and the lower mold 14, the laser beam LB which is irradiated from the heating head 20 is irradiated at predetermined positions of the photothermal conversion layer 18, and thus the temporary support 32 is portionally heated.

Figure 2:
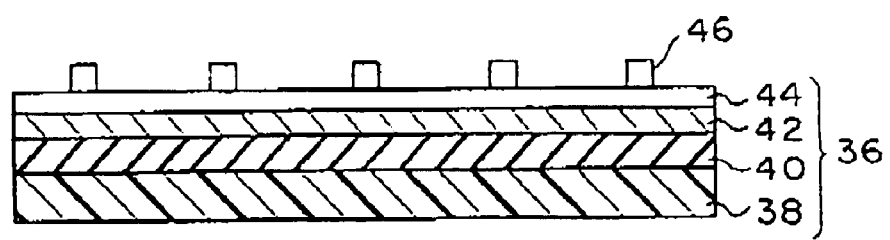
FIG. 2 is a schematic sectional view of a workpiece to which an organic electroluminescent light-emitting layer has been transferred.

Consequently, as shown in FIG. 2, the heated transfer material layer 34 is transferred onto the electron transport layer 44 of the workpiece 36 to serve as an organic electroluminescent light-emitting layer 46.

Here, digital image data corresponding to a pattern of the light-emitting layer (the organic electroluminescent light-emitting layer 46) that is to be formed at the organic electroluminescent element is inputted to the laser control device 22 shown in FIG. 1. On the basis of this image data, the laser control device 22 controls movements of the moving structure (the X-Y table), which moves integrally with the upper mold 12 and the lower mold 14, while outputting driving signals (drive pulses) to the laser oscillator 24.

Thus, in this transfer device 10, the laser beam LB irradiates the photothermal conversion layer 18 provided at the upper mold 12 in accordance with the pattern of the light-emitting layer of the organic electroluminescent element, and causes the photothermal conversion layer 18 to generate heat.

Now, the transfer film 30 and workpiece 36 that are employed in the present embodiment have an upper limit of pressuring of 6 MPa and an upper limit of heating of 250° C. In the transfer device 10, the pressuring and heating are carried out in ranges below this pressuring upper limit and heating upper limit.

Cooling piping 48 is provided at the upper mold 12 to serve as a cooling structure. This cooling piping 48 is disposed, for example, at peripheral edge portions of the upper mold 12, so as to avoid disturbing the irradiation of the laser beam LB at the photothermal conversion layer 18.

A coolant such as cooling water or the like is circulated in this cooling piping 48, similarly to the cooling piping 16 of the lower mold 14. As a result, temperature rises of the upper mold 12 as well as the lower mold 14 are restrained. Moreover, when a temperature rise does occur, rapid cooling is possible.

With the transfer device 10 structured thus, the transfer film 30 and the workpiece 36 are superposed in the state in which the transfer material layer 34 and the electron transport layer 44 are opposed, and disposed between the upper mold 12 and the lower mold 14. Here, the transfer film 30 is in contact with the photothermal conversion layer 18 of the upper mold 12, and the PI substrate 38 of the workpiece 36 is disposed so as to be in contact with the lower mold 14.

In this state, while the transfer film 30 and the workpiece 36 are integrally pressured, the laser beam LB is irradiated from the heating head 20 toward the upper mold 12.

The photothermal conversion layer 18 is provided at the transfer film 30 side face of the upper mold 12, and the laser beam LB irradiated from the heating head 20 transmits through the upper mold 12 and is irradiated to the photothermal conversion layer 18.

A portion of the photothermal conversion layer 18 on which the laser beam LB has been irradiated generates heat, and as a result, the transfer material layer 34 provided at the transfer film 30 is heated.

A portion of the transfer material layer 34 provided at the transfer film 30 that is softened by the heating becomes easy to detach from the temporary support 32, and this heated portion is easy to cleave at faces bordering an unheated portion. At this time, due to being pressured between the upper mold 12 and the lower mold 14, the softened transfer material layer 34 is transferred onto the electron transport layer 44 of the workpiece 36.

The transfer material layer 34 includes the component that forms the organic electroluminescent light-emitting layer 46. Thus, the organic electroluminescent light-emitting layer 46 is formed on the electron transport layer 44 at the workpiece 36.

In this transfer device 10, the laser beam LB is irradiated to the photothermal conversion layer 18 of the upper mold 12 based on the image data according to the pattern of the organic electroluminescent light-emitting layer 46 that is to be formed at the workpiece 36, while the upper mold 12 and the lower mold 14 move integrally in X and Y directions.

Here, because the laser beam LB is irradiated to the upper mold 12 while the upper mold 12 and the lower mold 14 are integrally moved in the two directions, i.e., the X direction and the Y direction (which are horizontal directions), the laser beam LB is always irradiated to the upper mold 12 at a constant angle (in the present embodiment, perpendicularly with respect to an upper face of the upper mold 12).

Therefore, the laser beam LB can reliably be irradiated to desired positions of the photothermal conversion layer 18.

Specifically, if the upper mold 12 did not move or moved only in one direction and the laser beam LB was deflected while scanning, an angle at which the laser beam LB was irradiated to the upper mold 12 would vary in accordance with a deflection angle of the laser beam LB. If the irradiation angle of the laser beam LB toward the upper mold 12 varied thus, a refraction angle of the laser beam LB inside the upper mold 12 would vary. Consequently, shifts in positions of irradiation of the laser beam LB at the photothermal conversion layer 18 might occur.

In contrast, in the transfer device 10, the irradiation angle of the laser beam LB at the upper mold 12 does not vary. Therefore, the laser beam LB can always be irradiated to the desired positions of the photothermal conversion layer 18.

The photothermal conversion layer 18 as described above generates heat at sites which the laser beam LB is irradiated, and heats the opposing transfer material layer 34. Here, because the laser beam LB is irradiated in accordance with the pattern of the organic electroluminescent light-emitting layer 46 that is to be formed at the workpiece 36, the transfer material layer 34 is heated and softened in accordance with this pattern of the organic electroluminescent light-emitting layer 46, cleaves at faces bordering unheated portions, and transfers to the workpiece 36. That is, only required portions of the transfer film 30 are heated while being pressured between the transfer material layer 34 and the workpiece 36, to transfer the transfer material layer 34 to the workpiece 36.

Thus, the transfer material layer 34 can be heated and softened efficiently. Further, in comparison to a case in which the whole area of the transfer film 30 is heated, temperature rises of the transfer film 30 and the workpiece 36 can be restrained, and temperature rises of the upper mold 12 and the lower mold 14 can be restrained.

Here, because the transfer film 30 and the workpiece 36 are pressured between the upper mold 12 and the lower mold 14, the transfer material layer 34 can be transferred to the workpiece 36 without being fused. Therefore, transfer without causing heat damage and the like to components of the transfer material layer 34 is possible.

The transfer material layer 34 may include components which would be damaged by heating and fusing. In the transfer device 10, because the transfer material layer 34 is heated while being pressured, it suffices if the transfer material layer 34 is merely softened, and then an adhesive force between the transfer material layer 34 and the workpiece 36 can be generated. Further, an adhesive force between the transfer material layer 34 and the temporary support 32 can be reduced by the softening, and an adhesive force at boundary portions surrounding the transfer material layer 34 can also be reduced by the softening.

Thus, in this transfer device 10, the transfer material layer 34 can be transferred to the workpiece 36 without being fused and, even in a case in which the transfer material layer 34 includes components which would be damaged by being fused, the transfer material layer 34 can be transferred to the workpiece 36 without damaging such components.

Furthermore, only the photothermal conversion layer 18 provided at the upper mold 12 is heated and raised in temperature, and temperature rises of the upper mold 12 itself are restrained. Further, because the photothermal conversion layer 18 is formed to be thin, heat amounts are small. Therefore, cooling is easier than in a case in which temperature rises occur in the upper mold 12 itself.

Further still, the cooling piping 48 is provided at the upper mold 12 and the cooling piping 16 is provided at the lower mold 14. Thus, cooling of the upper mold 12 and the lower mold 14, cooling of the photothermal conversion layer 18 heated by the laser beam LB, cooling of the transfer film 30 and the work piece 36 heated by the photothermal conversion layer 18 are realized.

As a result, the transfer film 30 and the workpiece 36 can be rapidly cooled and the upper mold 12 and the lower mold 14 are also rapidly cooled.

Rapid cooling of the transfer film 30 and the workpiece 36 is thus realized while temperature rises of the upper mold 12, the transfer film 30 and the workpiece 36 are prevented. Therefore, a transfer cycle of the transfer material layer 34 to the workpiece 36 can be shortened. Hence, after the photothermal conversion layer 18 has been cooled together with the upper mold 12 and the lower mold 14, the transfer temperature can be controlled with high accuracy and then subsequent transfer of material (the transfer material layer 34) to the workpiece 36 can be carried out.

That is, when the workpiece 36, to which the transfer material layer 34 (the organic electroluminescent light-emitting layer 46) has been transferred, is taken out from between the upper mold 12 and the lower mold 14 and the transfer film 30 is peeled off, if this operation is carried out before cooling of the transfer film 30 and the workpiece 36, a deterioration of finishing quality, such as displacement of the organic electroluminescent light-emitting layer 46, or the like will occur. Further, if a temperature when heating commences varies, the heating temperature will also vary.

Normally, it takes time for the transfer film 30 and the workpiece 36 to cool down, and this has a significant effect on the transfer cycle.

In contrast, in the transfer device 10, the laser beam LB is irradiated for heating only to the portions of the transfer material layer 34 that require transfer, and the cooling structures are provided at the upper mold 12 and the lower mold 14. Therefore, the transfer film 30 and the workpiece 36, as well as the upper mold 12 and the lower mold 14, can be rapidly cooled.

As a result, the transfer cycle is greatly shortened, and the transfer film 30 and the workpiece 36 can be taken out from between the upper mold 12 and the lower mold 14 a short time after the transfer of the organic electroluminescent light-emitting layer 46 has been completed.

Additionally, thermal shrinkage could be caused by heating the whole faces of the transfer film 30 and the workpiece 36. This thermal shrinkage could cause a deterioration in positional accuracy of the organic electroluminescent light-emitting layer 46 (the transfer material layer 34) that has been transferred to the workpiece 36.

However, in the transfer device 10, the laser beam LB irradiates only the photothermal conversion layer 18 opposing regions of the transfer material layer 34 that require transfer. Therefore, the whole faces of the transfer film 30 and the workpiece 36 are not heated, and the occurrence of thermal shrinkage at the transfer film 30 and workpiece 36 can be restrained. Thus, the transfer is possible with high accuracy. That is, with the transfer device 10, transfer processing can be carried out while effects of heat on the transfer film 30 and the workpiece 36 are suppressed to a minimum.

Thus, in the transfer device 10, because the transfer film 30 and the workpiece 36 are heated in accordance with the pattern of the organic electroluminescent light-emitting layer 46 that is to be formed at the workpiece 36, high accuracy transfer is possible. Further, because only portions of the transfer material layer 34 that are to be transferred to the workpiece 36 are heated, portions of the transfer material layer 34 for which transference to the workpiece 36 for forming the organic electroluminescent light-emitting layer 46 is not required are not transferred to the workpiece 36, and thus the organic electroluminescent light-emitting layer 46 can be formed at the workpiece 36 with a pattern which is cleanly delineated.

Because the transfer film 30 that is used in the transfer device 10 has a structure in which the transfer material layer 34 is formed on the temporary support 32, components of the transfer material layer 34 will not be affected by components of the photothermal conversion layer 18.

Therefore, when the laser beam LB is used to form the organic electroluminescent light-emitting layer 46 at the workpiece 36 by the thermal imaging process, the photothermal conversion layer 18 does not limit components of the transfer material layer 34. That is, components of the transfer material layer 34 are not limited by the photothermal conversion layer 18, and transfer to the workpiece 36 of the transfer material layer 34 which includes freely selected components can be implemented.

Second Embodiment

Next, a second embodiment of the present invention will be described. Note that basic structure of the second embodiment is similar to the first embodiment described above. Components that are the same in the second embodiment as in the first embodiment are assigned the same reference numerals, and descriptions thereof are omitted.

Figure 3:
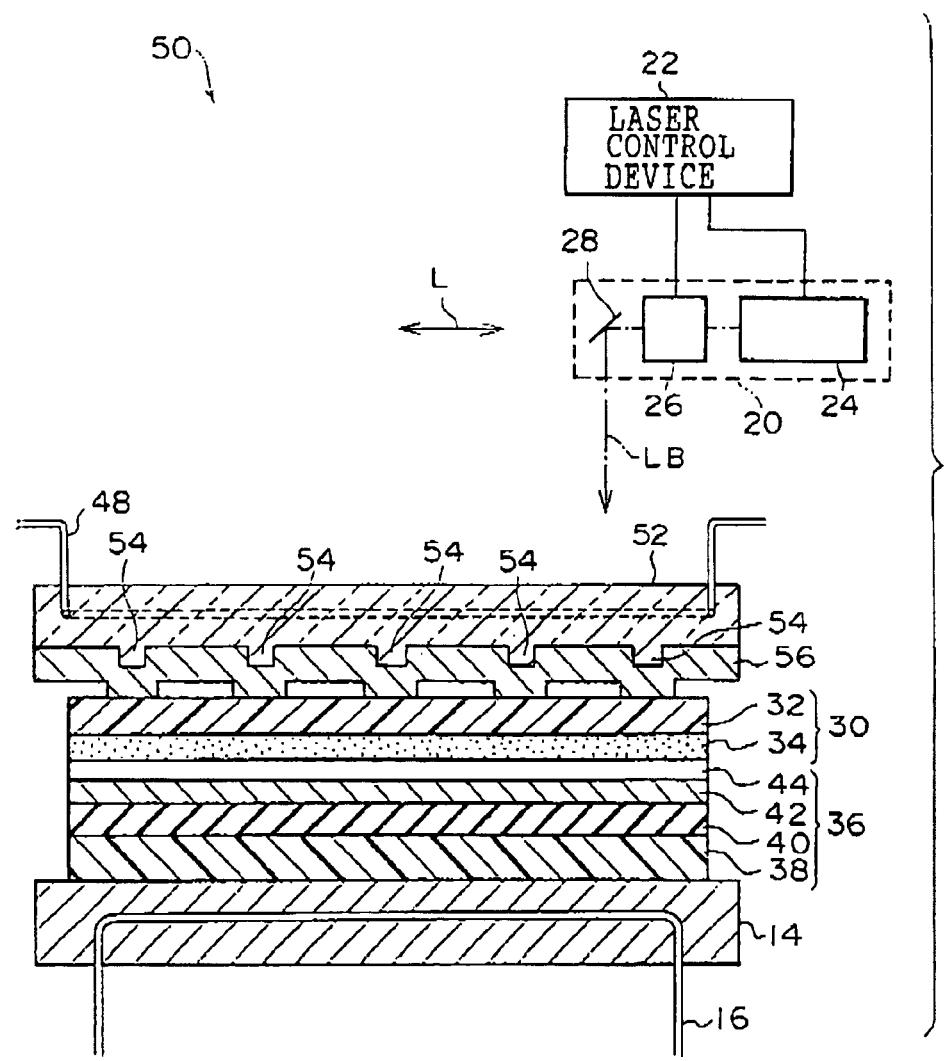
FIG. 3 is a schematic sectional view of a transfer device employed in a second embodiment.

FIG. 3 shows general structure of a transfer device 50 in which the second embodiment is applied. In the transfer device 50, an upper mold 52 is used in place of the upper mold 12 employed in the first embodiment.

At the upper mold 52, protruding portions 54 are formed at a face thereof that faces the transfer film 30. These protruding portions 54 are formed in accordance with the pattern of the organic electroluminescent light-emitting layer 46 that is to be formed at the workpiece 36. In other words, in the present embodiment, the protruding portions 54 are provided at the upper mold 52 such that, when the transfer film 30 and the workpiece 36 are positioned and sandwiched between the upper mold 52 and the lower mold 14, the protruding portions 54 correspond to the pattern of the organic electroluminescent light-emitting layer 46 to be formed at the workpiece 36.

Further, a photothermal conversion layer 56 is formed at the upper mold 52. The photothermal conversion layer 56 is formed to correspond with the form of the surface of the upper mold 52 that faces the transfer film 30 by, for example, vapor-depositing nickel to a predetermined thickness (e.g., 0.4 $\mu$m). Hence, the photothermal conversion layer 56 covers the protruding portions 54 of the upper mold 52, and contacting surfaces of the photothermal conversion layer 56 which contact the transfer film 30 have the same form as the pattern of the organic electroluminescent light-emitting layer 46 that is to be formed at the workpiece 36.

The laser control device 22 controls driving of the laser oscillator 24 so as to irradiate the laser beam LB at the protruding portions 54. The upper mold 52 and lower mold 14 sandwiching the transfer film 30 and the workpiece 36 are integral with one another, and are moved in the X and Y directions by the unillustrated moving structure. Accordingly, the laser control device 22 controls driving (on/off switching) of the laser oscillator 24 in accordance with movements of the upper mold 52.

In the transfer device 50 which is structured thus, the transfer film 30 is superposed with the workpiece 36 and pressured by the protruding portions 54 of the upper mold 52, and the laser beam LB is irradiated at the photothermal conversion layer 56 covering the protruding portions 54.

At this time, the photothermal conversion layer 56 covering the protruding portions 54 generates heat while the transfer film 30 and the workpiece 36 are being pressed together by the protruding portions 54 formed at the upper mold 52. As a result, the transfer material layer 34 of the transfer film 30 is heated and softened.

Thus, in the transfer device 50, the transfer material layer 34 can be softened and transferred to the workpiece 36 in a state in which a pressure force between the upper mold 52 and the lower mold 14 is relatively low in comparison with the transfer device 10 described above.

Hence, with the transfer device 50, the transfer material layer 34 can be transferred to the workpiece 36 and the organic electroluminescent light-emitting layer 46 can be formed at the workpiece 36 even more efficiently.

In the thus-structured transfer device 50, the laser beam LB is irradiated while the upper mold 52 moves in the X and Y directions. Thus, the laser beam LB can be accurately irradiated at the protruding portions 54 of the upper mold 52.

Further, the laser beam LB does not irradiate and heat the whole area of the transfer film 30, the workpiece 36 and the like. Therefore, temperature rises, thermal shrinkage and the like of the transfer film 30, the workpiece 36 and the like can be restrained. Further still, the temperature rises tend to occur mainly at the photothermal conversion layer 56 provided at the upper mold 52. Therefore, heat amounts are small, and rapid cooling by the cooling piping 16 and the cooling piping 48, which are provided at the lower mold 14 and the upper mold 52, is possible. Thus, the organic electroluminescent light-emitting layer 46 can be formed on the workpiece 36 with high accuracy while the transfer cycle is shortened.

Further again, in the transfer device 50, because only portions of the transfer material layer 34 that are to be transferred to the workpiece 36 are heated, portions of the transfer material layer 34 for which transference to the workpiece 36 for forming the organic electroluminescent light-emitting layer 46 is not required are not transferred to the workpiece 36, and thus the organic electroluminescent light-emitting layer 46 can be formed at the workpiece 36 with a pattern which is cleanly delineated.

Further yet, the components of the transfer material layer 34 will not be affected by components of the photothermal conversion layer 56, and the occurrence of heat damage or the like due to the transfer material layer 34 fusing will not occur. Thus, the transfer material layer 34 can be employed with freely selected components, and the organic electroluminescent light-emitting layer 46 can be excellently formed at the workpiece 36.

EXAMPLE

As an experimental example, the transfer device 10 in which the first embodiment is applied and the transfer device 50 in which the second embodiment is applied were each scanned with a laser beam LB using the laser oscillator 24 with an output of 0.75 W and an excitation wavelength of 808 nm. Scanning speeds were in a range from 5 m/s to 30 m/s, and spot diameters were in a range from 10 $\mu$m to 100 $\mu$m. The temperature of the upper mold 12 facing portions of the transfer material layer 34 to be transferred to the workpiece 36 was altered between 100° C., 150° C. and 250° C., and finishing results in these cases were inspected.

Using the cooling piping 16, cooling processing was applied to the lower mold 14 such that the temperature of the lower mold 14 was in a range from 10° C. to 20° C.

Figure 4:
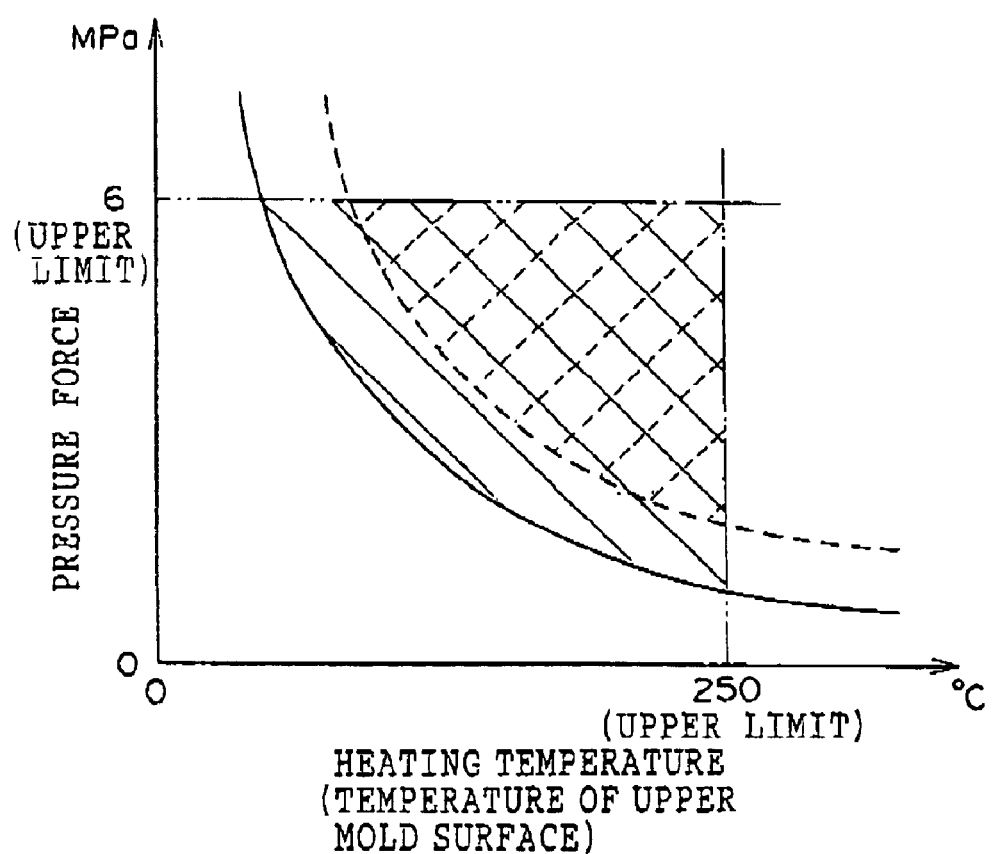
FIG. 4 is a graph showing pressure force in relation to heating temperature according to experimental results of an Example.

Experimental results thereof are shown in FIG. 4. In FIG. 4, the broken line indicates a lower limit, in relation to heating temperature, of a pressure force with which the organic electroluminescent light-emitting layer 46 can be formed with high quality in the transfer device 10. The solid line indicates a lower limit, in relation to heating temperature, of a pressure force with which the organic electroluminescent light-emitting layer 46 can be formed with high quality in the transfer device 50.

As shown in FIG. 4, in the transfer device 10, the high-quality organic electroluminescent light-emitting layer 46 could be formed on the workpiece 36 with a pressing force of 6 MPa when the temperature of the upper mold 12 was 100° C., a pressure force of at least 3 MPa for 150° C., and a pressure force of at least 2 MPa for 250° C.

In contrast, in the transfer device 50, the high quality organic electroluminescent light-emitting layer 46 could be formed on the workpiece 36 with a pressing force of 3 MPa or more when the temperature of the upper mold 52 was 100° C., a pressure force of at least 2 MPa for 150° C., and a pressure force of at least 1.5 MPa for 250° C.

Thus, with the transfer device 50 in which the protruding portions 54 are formed at the upper mold 52, substantially equivalent results can be obtained with lower pressure forces and/or heating temperatures than with the transfer device 10 in which the upper mold 12 is flat.

Third Embodiment

Next, a third embodiment of the present invention will be described.

Figure 5:
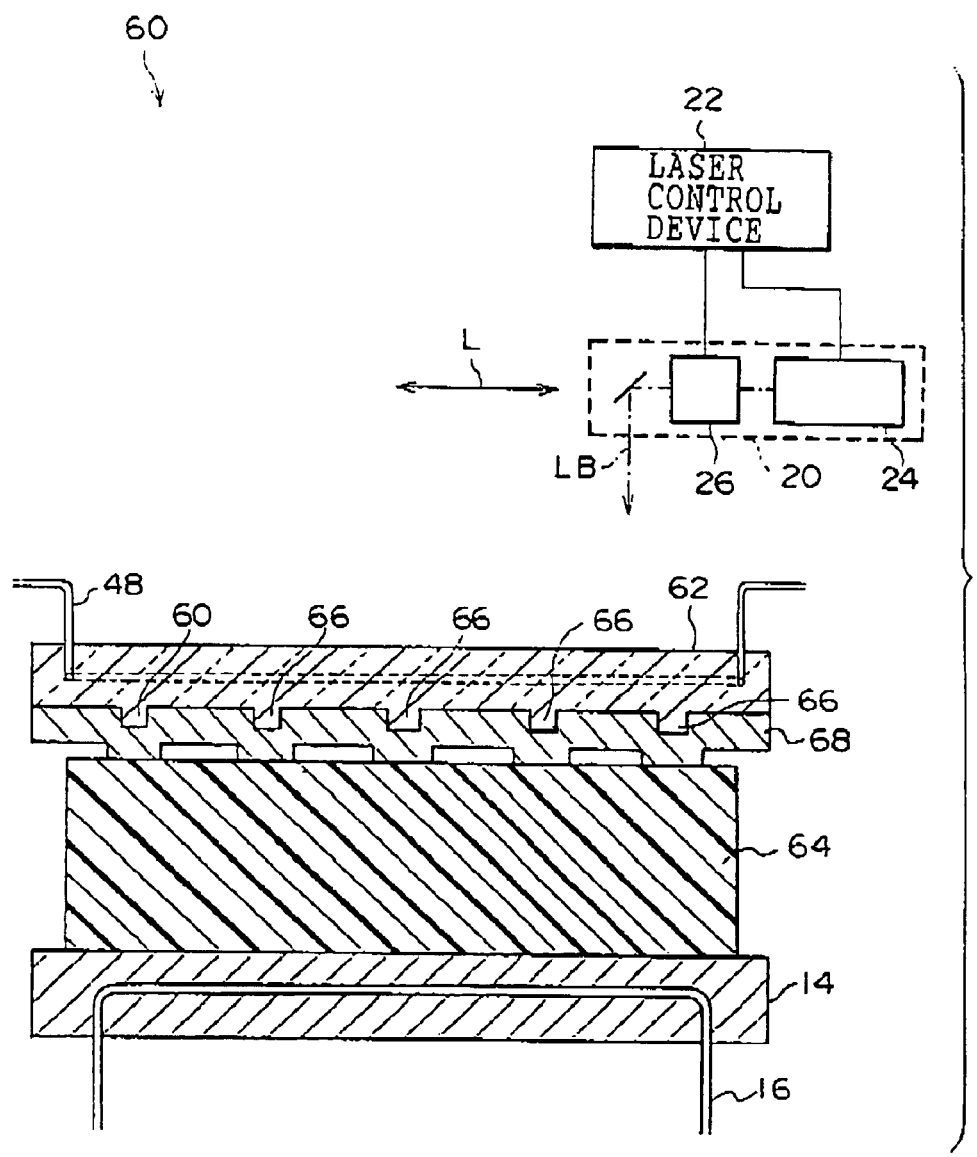
FIG. 5 is a schematic sectional view of a shape transfer device employed in a third embodiment.

FIG. 5 shows general structure of a shape transfer device 60 in which the third embodiment is applied. Note that for the third embodiment described below, components that are the same as in the first and/or second embodiments are assigned the same reference numerals, and descriptions thereof are omitted.

The shape transfer device 60 to which the third embodiment is applied is provided with an upper mold 62 facing the lower mold 14. A film 64, which is an object of shape transfer, is sandwiched between the lower mold 14 and the upper mold 62, and is heated while being pressured.

The upper mold 62 is formed in a substantially rectangular block shape, using quartz glass that transmits the laser beam LB. Protruding portions 66 are formed in a predetermined pattern at a face of the upper mold 62 that opposes the film 64. A photothermal conversion layer 68 is formed so as to cover the protruding portions 66.

In the shape transfer device 60, the lower mold 14 and upper mold 62, which sandwich the film 64, are moved in the X and Y directions by the unillustrated moving structure, while the laser beam LB irradiated from the heating head 20 is irradiated at the protruding portions 66 from above the upper mold 62. Hence, the laser beam LB is irradiated to the photothermal conversion layer 68 that covers the protruding portions 66.

Similarly to the photothermal conversion layer 18 and photothermal conversion layer 56 described above, the photothermal conversion layer 68 absorbs the energy of the laser beam LB and generates heat when irradiated by the laser beam LB that has been transmitted through the upper mold 62.

Because the protruding portions 66 are formed at the upper mold 62, the film 64 makes contact with the protruding portions 66 and is pressured. Here, because the laser beam LB irradiates and generates heat at the protruding portions 66, portions of the film 64 that oppose the protruding portions 66 are heated.

The film 64 is formed of PMMA, acrylic resin or the like. When the film 64 is heated, the heated portions are softened. Further, the heated, softened portions of the film 64 are plastically deformed due to being pressured by the protruding portions 66.

Figure 6:
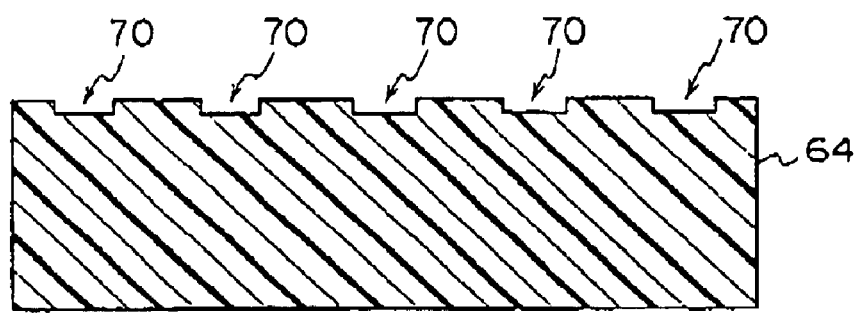
FIG. 6 is a schematic sectional view of a film which has undergone shape transfer.

As a result, as shown in FIG. 6, recessed portions 70 are formed in the film 64 in accordance with the protruding portions 66 formed at the upper mold 62. That is, in the shape transfer device 60, the film 64 is heated while being pressured between the lower mold 14 and the upper mold 62, and thus indentations and protrusions corresponding to indentations and protrusions (or rather, protrusions and indentations) formed at the upper mold 62 are formed at the surface of the film 64.

Further, as shown in FIG. 5, the cooling piping 16 is provided at the lower mold 14 and the cooling piping 48 is provided at the upper mold 62. Accordingly, temperature rises of the lower mold 14 and upper mold 62 are restrained, and rapid cooling of the film 64 is enabled.

With the shape transfer device 60 as described above, by formation of the protruding portions 66 at the upper mold 62 in accordance with an image pattern of a display device such as a liquid crystal display, an electroluminescent display or the like, formation of indentation portions (the recessed portions 70) corresponding to the image pattern in the film 64 can be effected. Furthermore, the shape transfer device 60 can be utilized for processing for embossing the surface of the film 64 or the like.

Now, a specific example of shape transfer using the shape transfer device 60 will be described.

For the shape transfer device 60, the laser oscillator 24 (the heating head 20) is employed with an excitation wavelength of 808 nm and an output of 0.75 W. An acrylic product serves as the film 64. Grooves with 100 µm by 50 µm openings and 30 µm depths are formed in this film 64, with a spacing of 15 µm, as the recessed portions 70.

At this time, a scanning speed of the laser beam LB is regulated in a range of 5 m/s to 30 m/s and a spot diameter of the laser beam LB is regulated in a range of 10 µm to 100 µm. Accordingly, a temperature of the protruding portions 66 formed at the upper mold 62 (a temperature of the film 64) is controlled to a range of 80° C. to 120° C.

Further, a pressure force on the film 64 is set in a range from 15 MPa to 30 MPa, and cooling water is circulated in the cooling piping 16 and the cooling piping 48 such that the temperature of the lower mold 14 is kept in a range from 10° C. to 20° C.

Thus, by implementing pressuring and heating of the film 64, the recessed portions 70 can be accurately formed in the surface of the film 64 in accordance with the pattern of the protruding portions 66 formed at the upper mold 62.

Now, in the shape transfer device 60, only portions of the film 64 that oppose the protruding portions 66 are heated, rather than the whole area of the film 64 being heated. Therefore, thermal contraction due to the whole of the film 64 being heated will not be caused in the film 64.

For example, if the whole of the film 64 was heated and softened, rigidity of the film 64 would decrease, and deviations (aberrations) in positional accuracy of the recessed portions 70 might occur. However, in the shape transfer device 60, rigidity of the film 64 can reliably be maintained. Thus, the recessed portions 70 can be formed with high precision and accurate positioning of the film 64.

Further, in the shape transfer device 60, temperature rises tend to occur mainly at the photothermal conversion layer 68. Therefore, heat amounts are small, and cooling is possible in a shorter time than in a case in which temperature rises occur in the upper mold 62 itself.

In addition, because the cooling piping 16 is provided at the lower mold 14 and the cooling piping 48 is provided at the upper mold 62, rapid cooling of the film 64 can be implemented, and shortening of a shape transfer cycle applied to the film 64 can be implemented.

Thus, shape transfer to a plurality of the film 64 can be efficiently carried out in a short time.

Further, only regions on the film 64 that form the recessed portions 70 are heated. Therefore, effects of heat on the film 64 can be suppressed to the minimum necessary. In other words, because the film 64 is not unnecessarily heated, the occurrence of thermal effects in the film 64 can be restrained.

In the first, second and third embodiments described above, the laser oscillator 24 is employed to emit the laser beam LB with a wavelength of 808 nm. However, in the present invention, as long as heat generation is caused in the photothermal conversion layer, the laser beam LB can be employed with any freely selected wavelength, such as a wavelength of 900 nm or the like in the 900 nm band (0.9 µm band), or in the 1000 nm band (1.0 µm band) thereabove or the like, and is not limited to wavelengths of 808 nm and the like in the 800 nm band (the 0.8 µm band).

Thus, arbitrary semiconductor lasers may be employed for the laser beam. The laser beam is not limited to semiconductor lasers: arbitrary laser beams such as solid state lasers, gas lasers, YAG lasers and the like may be employed.

Further, in these embodiments, quartz glass, ZnSe or the like is used for the upper mold 12, 52 or 62. However, the present embodiments are not limited thus. As long as transmissivity with respect to the laser beam LB is high and the laser beam LB will be efficiently transmitted, the upper mold 12, 52 or 62 can be formed of a freely selected material.

In the first, second and third embodiments, a vapor deposition layer is employed as the photothermal conversion layer. However, the photothermal conversion layer is not limited thus. A freely selected structure may be employed as long as the photothermal conversion layer generates heat efficiently when irradiated by the laser beam.

That is, it is satisfactory if the material of the upper side pressuring structure (the pressuring structures) and the material of the photothermal conversion layer are specified in accordance with the wavelength of the laser beam that is employed. In the first, second and third embodiments, the laser beam LB has been described with a wavelength of 808 nm as an example. Hence, the upper mold 12, 52 or 62 has been formed using quartz glass, ZnSe or the like having high transmissivity with respect to the laser beam LB of this wavelength, and the photothermal conversion layer has been formed using nickel. However, for this wavelength region, LiF, $MgF_2$, $CaF_2$, quartz and the like can be used for the upper side pressuring structure.

Carbon steel or the like may be used for the photothermal conversion layer. For a lower, short wavelength region, copper, polished silver or the like may be used.

Further still, in the first and second embodiments, the transfer material and transfer object are pressured using the upper mold and the lower mold as the pair of pressuring structures. However, the pressuring structures are not limited to such structures (the upper side pressuring structure and the lower side pressuring structure). For example, a roller may be used for one or both of the pair of pressuring structures, and pressuring and heating may be carried out while the donor sheet and transfer object are being conveyed.

Now, in a structure corresponding to the first embodiment, if a roller (transfer roller) is used as the upper side pressuring structure, a light source of the laser oscillating structure is disposed at an interior portion of the transfer roller, the photothermal conversion layer is formed at a peripheral face of this transfer roller, and a pressure roller is provided facing the transfer roller such that the transfer material and transfer object are pressured therebetween. In addition, the transfer roller should be formed of a material which transmits the laser beam LB (a material with high transmissivity) such that, when the laser beam LB is irradiated to the photothermal conversion layer, the laser beam LB can be irradiated to portions at which the photothermal conversion layer contacts the donor sheet.

Further, when, in a structure corresponding to the second embodiment, a roller (transfer roller) is used as one of the pressuring structures, the protruding portions are formed at a peripheral face of the transfer roller, and the laser beam LB is irradiated from the interior of the transfer roller toward the protruding portions. Here, by the photothermal conversion layer being formed so as to cover the protruding portions at the peripheral face of the transfer roller, the transfer material can be transferred to the transfer object such that the pattern of the protruding portions formed at the peripheral face of the transfer roller is clearly transferred to or reflected at the transfer object surface.

In the first and second embodiments, the transfer material layer 34 is provided at the temporary support 32. However, as long as components of the transfer material will not be affected by the photothermal conversion layer when transference of the transfer material is carried out, the transfer material may be applied to the photothermal conversion layer directly, or with an interference prevention layer possibly being formed therebetween, or the like.

The transfer material transfer method of the present invention is not limited to the transfer device 10 or the transfer device 50, and can be applied to a freely selected structure as long as the structure generates heat while pressuring a donor sheet which is provided with a transfer material, against a transfer object.

In the third embodiment, the shape transfer device 60 which uses the laser beam LB to heat the shape transfer object is described as an example. However, the shape transfer method of the present invention is not limited to the laser beam LB. Any freely selected light may be employed as long as the light energy thereof is converted to heat energy at the photothermal conversion layer for heating the shape transfer object.

For example, the shape transfer object may be heated by irradiating light of an arbitrary wavelength such as, for example, infra-red rays or the like at the photothermal conversion layer.

Infra-red rays or the like can be employed as an example of such light. As an example of infra-red rays, a case which employs near infra-red rays will be described as a fourth embodiment.

Fourth Embodiment

A fourth embodiment of the present invention will be described hereinafter. Note that basic structure of the fourth embodiment is similar to the third embodiment described above. Components that are the same in the fourth embodiment as in the third embodiment are assigned the same reference numerals, and descriptions thereof are omitted.

Figure 7:
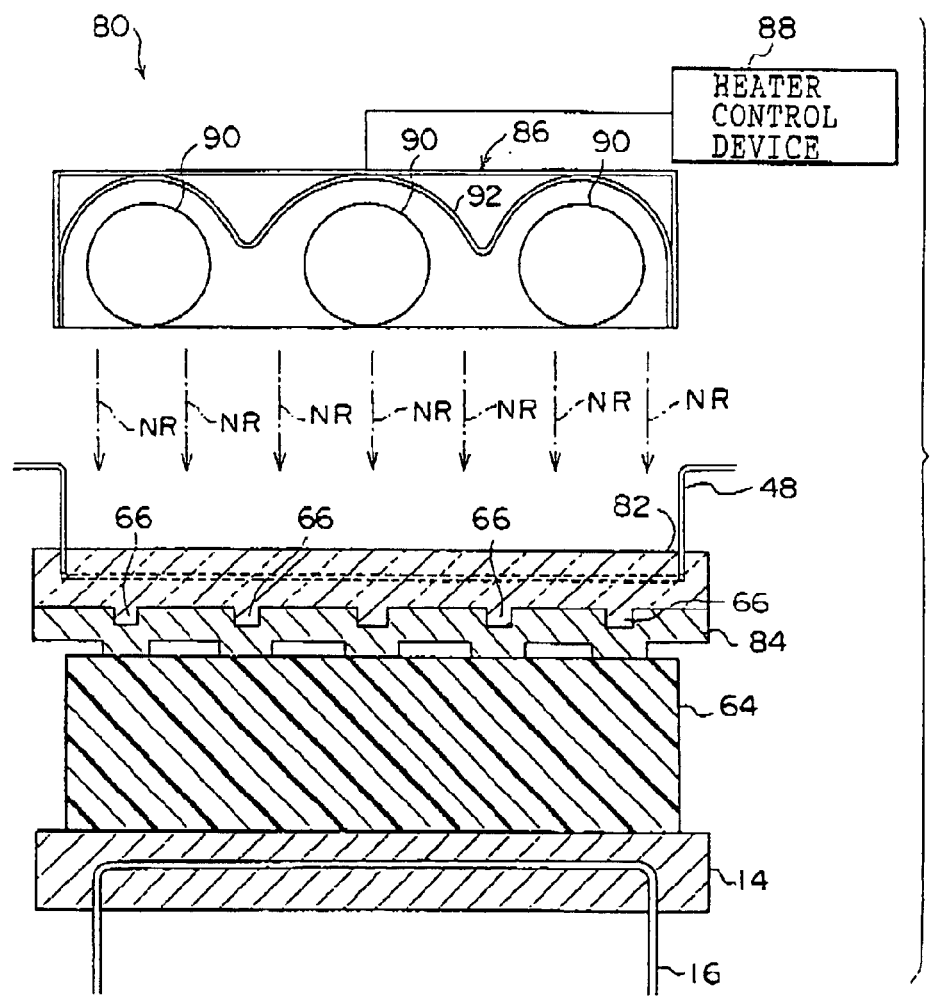
FIG. 7 is a schematic sectional view of a shape transfer device employed in a fourth embodiment.

FIG. 7 shows general structure of a shape transfer device 80 in which the fourth embodiment is applied. In this shape transfer device 80, the protruding portions 66 are formed at an upper mold 82 which faces the lower mold 14, and a photothermal conversion layer 84 is formed so as to cover the protruding portions 66.

Further, in the shape transfer device 80, a heater unit 86 and a heater control device 88, which controls the heater unit 86, are provided instead of the heating head 20 and the laser control device 22.

Heaters 90 and a reflection plate 92 are provided at the heater unit 86. The heaters 90 emit near infra-red rays NR, which serve as a light beam. The reflection plate 92 reflects the near infra-red rays NR emitted from the heaters 90 toward the upper mold 82.

A ceramic, tungsten or the like may be employed for the heaters 90. The heaters 90 emit the near infra-red rays NR with a peak thereof being a predetermined wavelength. A plurality of the heaters 90 is provided at the heater unit 86. As a result, the near infra-red rays NR can be irradiated uniformly at the whole area of the upper mold 82, and at least the whole area of the film 64 that is disposed between the upper mold 82 and the lower mold 14. In the present embodiment, long lamp heaters which emit light using tungsten are employed as an example.

The near infra-red rays NR that are emitted from the heaters 90 generally include the wavelength of the laser beam LB emitted by the aforementioned laser oscillator 24. However, the heaters 90 employed in this fourth embodiment have a peak wavelength in a range from 1.2 μm (1200 nm) to 2.0 μm (2000 nm), which is greater than the wavelength employed for the laser beam LB.

The heater control device 88 is capable of heating the film 64 to a prescribed temperature by controlling the heaters 90.

The upper mold 82 uses quartz glass or the like having high transmissivity with respect to the near infra-red rays NR, and is formed in a substantially rectangular block shape. The heater unit 86 irradiates the near infra-red rays NR substantially perpendicularly with respect to an upper face of the upper mold 82.

As a result, absorption in the upper mold 82 of the near infra-red rays NR irradiated to the upper mold 82 is restrained, and the near infra-red rays NR are efficiently transmitted within the upper mold 82.

At this upper mold 82, a metallic material with high absorptivity with respect to the near infra-red rays NR is employed for the photothermal conversion layer 84 formed at the upper mold 82.

Thus, the near infra-red rays NR that are transmitted through the upper mold 82 are irradiated to the photothermal conversion layer 84, and the photothermal conversion layer 84 generates heat by absorbing the near infra-red rays NR. It is preferable that the photothermal conversion layer 84 suppresses reflection at a boundary face between the photothermal conversion layer 84 and the upper mold 82. Hence, an absorption rate of the near infra-red rays NR is improved, and efficient photothermal conversion is enabled.

That is, in the shape transfer device 80, the photothermal conversion layer 84 is caused to generate heat by radiant heat emitted in the form of near infra-red rays from the heaters 90, and thus heats the film 64. Here, because the film 64 is in contact with the photothermal conversion layer 84 at portions opposing the protruding portions 66, only these contacting portions are heated.

In the shape transfer device 80 that is structured thus, the film 64, which is an object of shape transfer, is sandwiched between the lower mold 14 and the upper mold 82 and, while being pressured, is irradiated with the near infra-red rays NR emitted from the heaters 90 of the heater unit 86.

As a result, the photothermal conversion layer 84 provided at the upper mold 82 generates heat and, because the photothermal conversion layer 84 that covers the protruding portions 66 of the upper mold 82 contacts the surface of the film 64, the photothermal conversion layer 84 heats those portions of the film 64.

Because the portions of the film 64 that oppose the protruding portions 66 are in contact with the photothermal conversion layer 84, these portions are heated and softened. Further, these portions contacting the photothermal conversion layer 84 are pressured by the upper mold 82. Thus, the portions of the film 64 that are heated and softened plastically deform, and form the recessed portions 70 (see FIG. 6).

Thus, in the shape transfer device 80, the recessed portions 70 are formed in the film 64 with a pattern corresponding to the protruding portions 66 of the upper mold 82. In other words, shape transfer to the film 64 is realized.

Therefore, in this shape transfer device 80 which uses the near infra-red rays NR, the shaping of the protruding portions 66 formed at the upper mold 82 can be transferred to the film 64. Here, because the whole face of the film 64 is not heated, temperature rises of the film 64 can be restrained.

That is, although the near infra-red rays NR is irradiated on substantially the whole area of the upper mold 82, the near infra-red rays NR are blocked at the photothermal conversion layer 84 provided at the upper mold 82, and do not directly heat the film 64. Hence, the film 64 is heated only at the portions corresponding to the protruding portions 66 formed at the upper mold 82.

Therefore, similarly to the shape transfer device 60 described above, not the whole area of the film 64 is heated. Therefore, the recessed portions 70 can be formed at the film 64 with high accuracy.

Further, in the shape transfer device 80, because temperature rises occur mainly at the photothermal conversion layer 84, heat amounts are kept small, and because the cooling piping 16 and the cooling piping 48 are provided, rapid cooling of the film 64 after shape transfer has been completed is possible. Thus, a shortening of the shape transfer cycle can be expected.

Therefore, the cycle of shape transfer to the film 64 can also be shortened in the shape transfer device 80 which uses the near infra-red rays NR, and an improvement in productivity when shape transfer to the film 64 is being carried out can be expected.

Although the above description of the fourth embodiment has described use of the near infra-red rays NR, the light that is irradiated to the photothermal conversion layer is not limited thus. Light of appropriately selected wavelengths such as middle infra-red rays, far infra-red rays and the like may be used. It is sufficient that the photothermal conversion layer employs a material with high absorptivity with respect to the wavelength of the light.

Further, in the fourth embodiment, the heater unit 86 which is capable of irradiating the near infra-red rays NR to at least the whole area of the film 64 is employed. However, it is also possible, if an irradiation region on the film 64 of the near infra-red rays from the heater unit 86 is small, for an X-Y table or the like to be used to relatively move the heater unit 86 and the film 64 (i.e., the upper mold 82 and the lower mold 14), so that substantially the whole area of the film 64 can be irradiated with the near infra-red rays.

Now, in the first to fourth embodiments described above, the cooling piping 48 is provided respectively at the upper molds 12, 52, 62 and 82, and the cooling piping 16 is provided at the lower mold 14. However, the cooling structure is not limited thus. As long as the upper side pressuring structure and lower side pressuring structure are both suitably cooled, freely selected structures can be employed, such as, for example, structures that blow cooling air and the like.

Further, although the cooling piping 48 is provided at outer edge portions of the upper mold, it is sufficient that the cooling piping 48 be disposed so as not to block the laser beam LB, near infra-red rays NR or the like. For example, in cases in which the cooling piping 48 is provided at the 52, 62 or 82, it is sufficient if the irradiation of the laser beam LB or near infra-red rays NR toward at least the protruding portions 54 or 66 is not obstructed. Thus, it is satisfactory if the cooling piping 48 is arranged to avoid these protruding portions 54 or 66. For the upper mold 12, if the transfer pattern of the transfer material layer 34, which pattern represents the portions that the laser beam LB is to be irradiated, can be confirmed in advance, it is sufficient for the cooling piping 48 to be arranged so as to avoid these portions (which correspond to the transfer pattern).

In the first to fourth embodiments, both the upper side pressuring structure and the lower side pressuring structure are cooled. However, it is suffices that at least, the upper side pressuring structure, the lower side pressuring structure, the transfer material and the transfer object or shape transfer object can be cooled by cooling at least one of the upper side pressuring structure and the lower side pressuring structure, preferably the lower side pressuring structure.

In these embodiments, the upper side pressuring structure, which is irradiated by infra-red light such as laser light, near infra-red rays or the like, has been described as being disposed at an upper side. However, the upper side pressuring structure is not limited thus. For example, if the upper side pressuring structure and the lower side pressuring structure are disposed in opposition along a horizontal direction, whichever is irradiated by laser light, infra-red rays from a heating light source or the like is the upper side pressuring structure.

As described above, in the transfer material transfer method and shape transfer method of the present invention, a roller may be employed as a pressuring structure. Thus, while a web-form transfer object is being conveyed, the transfer material can be transferred to this transfer object continuously, or shape transfer thereon can be implemented continuously.

Now, material transfer and shape transfer to a web-form transfer object will be described.

Fifth Embodiment

Figure 8:
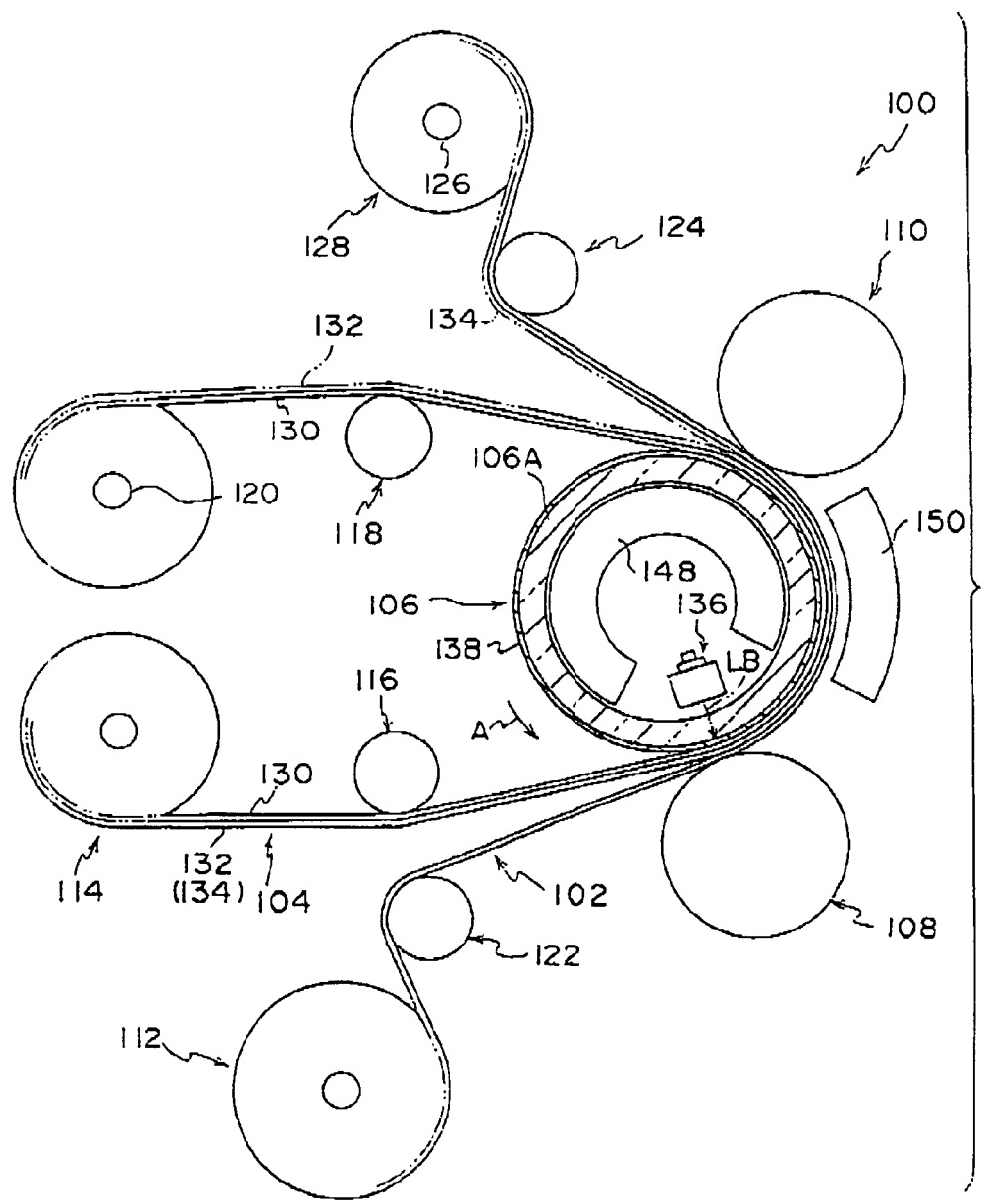
FIG. 8 is a schematic sectional view of a material transfer device employed in a fifth embodiment.

FIG. 8 shows general structure of the principal elements of a transfer device (a material transfer device 100) in which a fifth embodiment is applied. Note that components that are the same in the fifth embodiment as in the first to fourth embodiments are assigned the same reference numerals, and descriptions thereof are omitted.

In the material transfer device 100, a workpiece film 102, which is the transfer object, is superposed with a donor film 104, at which the transfer material is provided. By a thermal imaging process, a transfer image is formed on the workpiece film 102 by the transfer material. In other words, the transfer material provided at the donor film 104 is transferred to the workpiece film 102 in a prescribed pattern.

A transfer roller 106, which is the pressuring structure, is provided in the material transfer device 100. A pressure roller 108 and a peeling roller 110 are provided at peripheral vicinities of the transfer roller 106.

A film roll 112, on which the workpiece film 102 is wound in roll form, and a donor roll 114, on which the donor film 104 is wound in roll form, are loaded in the material transfer device 100.

The donor film 104, which is drawn out from the donor roll 114, is wound around an idling roller 116, fed in between the transfer roller 106 and the pressure roller 108, and wound around the transfer roller 106. The donor film 104 is drawn out from between the transfer roller 106 and the peeling roller 110, and the donor film 104 is wound around an idling roller 118 and then wound onto a winding shaft 120.

The workpiece film 102, which is drawn out from the film roll 112, is wound around an idling roller 122, fed in between the transfer roller 106 and the pressure roller 108 and wound around the transfer roller 106. Thus, the workpiece film 102 is superposed with the donor film 104.

The workpiece film 102 is drawn out from between the transfer roller 106 and the peeling roller 110, and the workpiece film 102 is wound around an idling roller 124 and then wound onto a winding shaft 126. Thus, the workpiece film 102 for which material transfer has been completed is wound on at the winding shaft 126 to form a product roll 128.

As shown in FIG. 9A, a temporary support 130, which is formed as a web, is employed for the donor film 104, and a transfer material layer 132, which is formed of the transfer material, is provided at one face of this temporary support 130. For the temporary support 130, a flexible material which is chemically and thermally stable is employed.

As shown in FIG. 8, in the material transfer device 100, the donor film 104 is wound around the transfer roller 106 such that the temporary support 130 is at the transfer roller 106 side of the donor film 104, and the workpiece film 102 is superposed with the donor film 104 so as to be in close contact with the transfer material layer 132, and wound around the transfer roller 106. At this time, while the workpiece film 102 is superposed with the donor film 104, the pressure roller 108 pressures the workpiece film 102 and the donor film 104 by nipping the same between the pressure roller 108 and the transfer roller 106.

The transfer material layer 132 provided at the donor film 104 is softened by being heated, and is easily detached from the temporary support 130, while faces thereof bordering unheated portions are easily cleaved. At this time, because the transfer material layer 132 is pressed toward the workpiece film 102, which is the transfer object, a component of the transfer material layer 132 of the donor film 104 (a transfer material 134) detaches from the temporary support 130 and is transferred to the workpiece film 102 as shown in FIG. 9B.

As shown in FIG. 8, the transfer roller 106 provided in the material transfer device 100 is formed in a cylindrical shape whose interior is hollow. At the interior of the transfer roller 106, a laser head 136, which emits the laser beam LB, is disposed at a predetermined position. The laser head 136 is fixed at the predetermined position, and the transfer roller 106 is relatively rotated at the predetermined speed by driving of an unillustrated driving structure.

The laser head 136 emits the laser beam LB from the interior of the transfer roller 106 toward a region of juxtaposition of the transfer roller 106 with the pressure roller 108.

At the transfer roller 106, a base member 106A, which is an outer peripheral portion thereof, is formed of a material which transmits the laser beam LB (a laser light-transmissive material), such as quartz glass, ZnSe or the like. A photothermal conversion layer 138 is also formed at the transfer roller 106, at an outer peripheral face of the transfer roller 106.

The photothermal conversion layer 138 is formed to a thickness of around 0.4 $\mu$m by, for example, vapor depositing nickel (Ni) or the like, which absorbs laser light and generates heat. When irradiated by the laser beam LB, the portions of the photothermal conversion layer 138 irradiated by the laser beam LB generate heat.

The laser beam LB irradiated from the laser head 136 is transmitted through the base member 106A of the transfer roller 106, reaches the photothermal conversion layer 138, and causes the photothermal conversion layer 138 to generate heat. As a result, the donor film 104 and workpiece film 102 that oppose this photothermal conversion layer 138 are heated.

When the workpiece film 102 and donor film 104 are heated in the pressured state, a heated portion of the transfer material layer 132 softens, and the transfer material 134 thereat detaches from the temporary support 130 and transfers to the workpiece film 102.

The laser head 136 is formed in a rectangular block shape which is long in one direction, and is disposed such that the long direction thereof runs along a transverse direction relative to conveyance of the workpiece film 102 and the donor film 104, which transverse direction is an axial direction of the transfer roller 106.

Figure 10:
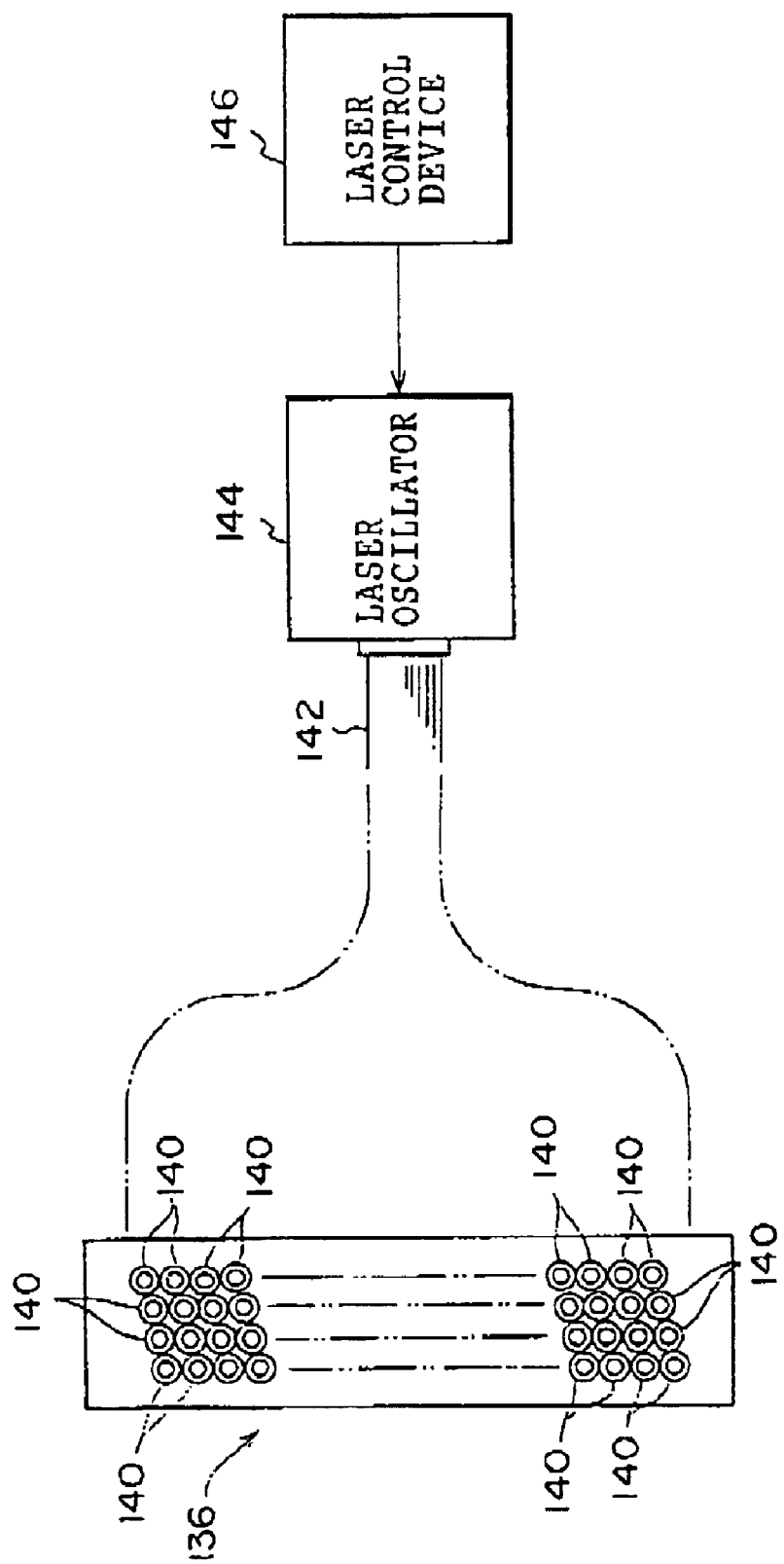
FIG. 10 is a schematic sectional view of an example of a laser light source.

As shown in FIG. 10, at a face of the laser head 136 (a face at a paper front side of FIG. 10) which opposes an outer peripheral portion of the transfer roller 106 (which is not shown in FIG. 10), distal ends of a large number of optical fiber cables 142 are disposed to serve as emission apertures 140 of the laser beam LB. In the present embodiment, four rows of the emission apertures 140 are formed in the laser head 136 as an example.

The optical fiber cables 142 which are connected to the laser head 136 are also connected to a laser oscillator 144. This laser oscillator 144 is controlled by a laser control device 146, and emits laser light of a predetermined wavelength. In the present embodiment, a semiconductor laser oscillator with a wavelength of 808 nm, for example, is employed for the laser oscillator 144. A material which transmits laser light of this wavelength is selected for the base member 106A of the transfer roller 106. Moreover, a material which efficiently absorbs the energy of laser light of this wavelength and generates heat is selected for the photothermal conversion layer 138.

The laser light generated at the laser oscillator 144 is transmitted through the optical fiber cables 142 and emitted from the emission apertures 140 as the laser beam LB. Here, the laser bead 136 is capable of emitting the laser beam toward arbitrary positions along the axial direction of the transfer roller 106, and thus the material transfer device 100 is capable of transferring the transfer material 134 to the workpiece film 102 at the arbitrary positions. When the laser beam LB is emitted from the respective emission apertures 140 of the laser head 136, the laser beam LB is focused to have a spot form with a predetermined diameter at the photothermal conversion layer 138.

The laser beam LB is irradiated from the laser head 136 in accordance with a pattern of the transfer material 134 that is to transfer to the workpiece film 102. That is, the direction of conveyance of the donor film 104 and the workpiece film 102 by the transfer roller 106 serves as a direction of sub-scanning and, by the laser head 136 main scanning with the laser beam LB, the transfer material 134 is transferred to the workpiece film 102 in the prescribed pattern.

As shown in FIG. 8, a cooling apparatus 148 is disposed at the interior of the transfer roller 106, and a cooling apparatus 150 is disposed between the pressure roller 108 and the peeling roller 110. The cooling apparatuses 148 and 150 are each provided to be relatively rotatable with respect to the transfer roller 106.

The cooling apparatus 148 is formed in a circular arc shape so as to run along an interior peripheral face of the transfer roller 106. The cooling apparatus 148 opposes the interior peripheral face of the transfer roller 106 over a range excluding a vicinity of the laser head 136, and curves so as to run along the interior peripheral face of the transfer roller 106. The cooling apparatus 150 is disposed to oppose the outer peripheral face of the transfer roller 106, and is curved so as to run along the outer peripheral face of the transfer roller 106.

At each of the cooling apparatuses 148 and 150, cooling water or a cooling liquid, which is supplied at a predetermined temperature (for example, 10° C. to 20° C.), is supplied through, for example, unillustrated piping (cooling pipes), and cooling air that has been cooled by this cooling water is blown out.

Thus, the cooling apparatus 148 principally cools the base member 106A of the transfer roller 106 from thereinside, and the cooling apparatus 150 principally cools the donor film 104 and workpiece film 102 wound around the transfer roller 106. The cooling apparatuses 148 and 150 can have freely selected structures as long as they are capable of suitably cooling the workpiece film 102, the donor film 104 and the transfer roller 106.

Now, as operation of the fifth embodiment, formation of organic electroluminescent light-emitting elements using the material transfer device 100 is described. Note that the present invention can be applied to transfer of transfer materials to freely selected web-form transfer objects.

When forming the organic electroluminescent light-emitting elements, an organic electroluminescent light-emitting layer is used as the transfer material layer 132 of the donor film 104. In this case, polyethylene terephthalate (PET), polyether sulfone (PES) or the like formed to a thickness of 5 μm is used as the temporary support 130.

A structure similar to the temporary support 32 described earlier may be employed as the temporary support 130, and a structure similar to the transfer material layer 34 described earlier may be employed as the transfer material layer 132. A heating temperature of the transfer material layer 132 by the photothermal conversion layer 138 is from 40° C. to 250° C., preferably from 50° C. to 200° C., and more preferably from 60° C. to 180° C. For the workpiece film 102, which is the transfer object, a structure similar to the workpiece 36 described earlier may be employed.

In the material transfer device 100, an upper limit of pressuring of the workpiece film 102 and the donor film 104 by the transfer roller 106 and the pressure roller 108 is 6 MPa, and an upper limit of heating is 250° C., and pressuring and heating are implemented within these ranges.

The transfer roller 106, the pressure roller 108 and the peeling roller 110 are rotatingly driven such that a line speed, which is a conveyance speed of the workpiece film 102, is 100 mm/s and an irradiation time of the laser beam LB (the duration of irradiation per one pixel) is 1 ms/pixel.

The donor film 104 that has been drawn out from the donor roll 114 and the workpiece film 102 that has been drawn out from the film roll 112 are superposed while being fed in between the transfer roller 106 and the pressure roller 108. Here, the transfer material layer 132 of the donor film 104 faces the workpiece film 102 (an insulating layer side face thereof).

Hence, the workpiece film 102 and donor film 104 are pressured in the superposed state, and conveyed to be wound around the transfer roller 106.

The laser head 136 is provided at the interior of the transfer roller 106, and the laser beam LB is irradiated from the laser head 136 toward a vicinity of the point of juxtaposition of the transfer roller 106 with the pressure roller 108, in accordance with the pattern of transfer of the transfer material 134 to the workpiece film 102. At this time, the laser beam LB is emitted at the workpiece film 102 in accordance with the pattern of transfer of the transfer material 134 to the workpiece film 102 with the direction of conveyance of the workpiece film 102 by the transfer roller 106 serving as the sub-scanning direction.

The laser beam LB emitted from the laser head 136 is transmitted through the base member 106A of the transfer roller 106 and is irradiated to the photothermal conversion layer 138.

When the photothermal conversion layer 138 is irradiated by the laser beam LB, the photothermal conversion layer 138 absorbs the energy of the laser beam LB and generates heat at the portion that the laser beam LB is being irradiated.

As a result, the donor film 104 at a portion opposing the heat-generating photothermal conversion layer 138 is heated, and the transfer material layer 132 opposing this portion is softened. Here, because the workpiece film 102 and the donor film 104 are being pressed together by the transfer roller 106 and the pressure roller 108, a component of the softened transfer material layer 132 detaches from the temporary support 130 of the donor film 104 and is transferred, as the transfer material 134, to the workpiece film 102.

Thus, in the material transfer device 100, because the photothermal conversion layer 138 is heated only at portions where the transfer material 134 is to transfer, the workpiece film 102 and donor film 104 can be efficiently heated to implement transfer of the transfer material 134. In other words, because the base member 106A of the transfer roller 106 is not heated, and only required portions of the photothermal conversion layer 138 are heated, efficient heating is enabled.

Hence, the workpiece film 102 and donor film 104 which have been heated in the pressured state subsequently oppose the cooling apparatus 150, and the base member 106A where the photothermal conversion layer 138 has been heated opposes the cooling apparatus 148.

Accordingly, the workpiece film 102 and donor film 104 are cooled by the cooling apparatus 150, the donor film 104 is wound onto the winding shaft 120, and the workpiece film 102 is wound onto the winding shaft 126 to form the product roll 128.

Meanwhile, the photothermal conversion layer 138 that has been heated by the laser beam LB, and the base member 106A of the transfer roller 106 at which this photothermal conversion layer 138 is disposed, are cooled by the cooling apparatus 148 while proceeding back round to the position opposing the laser head 136.

Now, because the photothermal conversion layer 138 generates heat only at positions where the transfer material 134 is to be transferred to the workpiece film 102, temperature rises of the base member 106A, undesired temperature rises at portions of the photothermal conversion layer 138 not requiring heating and imaging, and the like will not occur.

Accordingly, because increases in heat amounts at the transfer roller 106 are suppressed, the base member 106A and the photothermal conversion layer 138 can be reliably cooled in a short time by the cooling apparatus 148. In other words, when thermal transfer is implemented using the transfer roller 106 in this material transfer device 100, actual heat capacity is lowered, and thus efficient heating and reliable cooling are enabled.

Thus, the base member 106A and photothermal conversion layer 138 of the transfer roller 106 can perform heating of the workpiece film 102 and the donor film 104 from substantially the same temperature. Therefore, highly accurate control of the heating temperature, by controlling the irradiation times of the laser beam LB, is possible.

If the whole of the workpiece film 102 were cooled after being heated, thermal shrinkage might occur, a reduction in positional accuracy of the transfer material 134 might occur because of this thermal shrinkage, and thermal deformation might occur.

However, in the material transfer device 100, because the workpiece film 102 and donor film 104 are heated only at portions opposing the photothermal conversion layer 138 that is heated, the occurrence of thermal shrinkage in the workpiece film 102 can be suppressed. Thus, the occurrence of aberrations in positional accuracy of the transfer material 134 due to thermal shrinkage can be avoided, and the transfer material 134 can be transferred to the workpiece film 102 with high accuracy.

Further, if the temperature was high when the workpiece film 102 and transfer material 134 are peeled from the temporary support 130 at the peeling roller 110 and the workpiece film 102 and transfer material 134 are wound onto the winding shaft 126 in layers, changes in characteristics, mispositioning of the transfer material 134 and the like might occur because of thermal effects. However, in the material transfer device 100, a temperature rise of the workpiece film 102 can be suppressed in comparison with heating the whole area of the workpiece film 102, and cooling by the cooling apparatus 150 in a short time is possible. Therefore, production can be completed without thermal effects being caused to the workpiece film 102 and transfer material 134.

Thus, with this material transfer device 100, it is possible to continuously form high quality organic electroluminescent light-emitting elements. Herein, the duration until cooling of the workpiece film 102, the transfer roller 106 and the like can be kept short, and thus an efficient transfer process with a short transfer cycle is enabled.

Note that although, in the fifth embodiment, the workpiece film 102 and donor film 104 wound around the transfer roller 106 are pressured using the pressure roller 108, structure of the pressuring structure is not limited thus.

Figure 11:
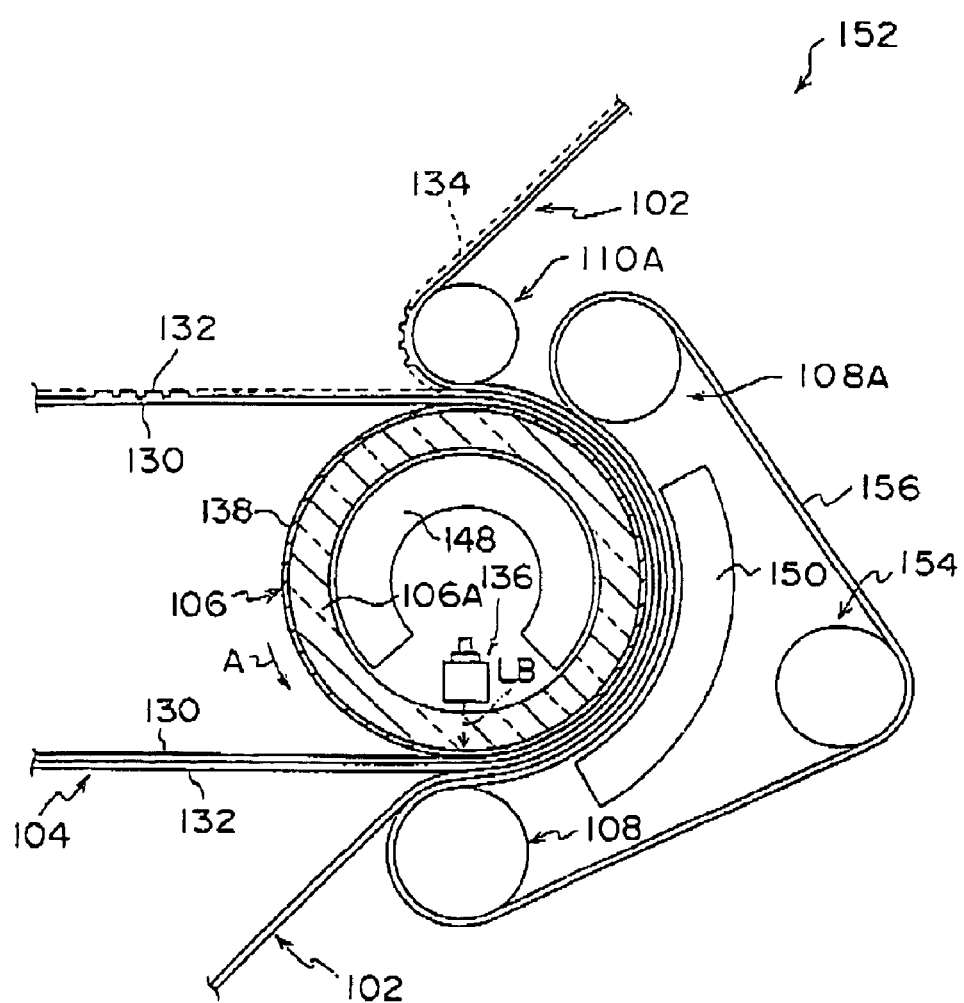
FIG. 11 is a schematic sectional view showing an example of another material transfer device.

For example, in a material transfer device 152 shown in FIG. 11, a peeling roller 110A is provided facing the outer peripheral face of the transfer roller 106 together with the pressure roller 108. Another pressure roller 108A is provided in a vicinity of the peeling roller 110A, a tension roller 154 is disposed between the pressure roller 108 and the pressure roller 108A, and an endless pressure belt 156 is wound around the pressure roller 108, the pressure roller 108A and the tension roller 154.

A width dimension of this pressure belt 156 is wider than width dimensions of the workpiece film 102 and the donor film 104. The cooling apparatus 150 cools the pressure belt 156 between the pressure roller 108 and the pressure roller 108A. Rather than the endless pressure belt 156, a plurality of pressure rollers, for example, could be disposed between the pressure roller 108 and the pressure roller 108A so as to pressure the workpiece film 102 and donor film 104.

The material transfer device 152 that is structured as described above nips the workpiece film 102 and donor film 104 with the transfer roller 106 and pressure belt 156 between the pressure roller 108 and pressure roller 108A.

Consequently, in the state of having been pressured by the transfer roller 106 and the pressure roller 108, the heated (thermally transferred) workpiece film 102 and donor film 104 are conveyed by the pressure belt 156 in a state in which a predetermined pressure is applied. At this time, because the base member 106A of the transfer roller 106 and the pressure belt 156 are cooled by the cooling apparatuses 148 and 150, cooling of the workpiece film 102 can be realized.

Thus, in the material transfer device 152, because the workpiece film 102 and donor film 104 can be cooled while being pressured, the transfer material 134 can be reliably transferred to the workpiece film 102 with high accuracy.

The pressure belt 156 in a mesh form may be employed in this material transfer device 152, thereby enabling direct cooling of the workpiece film 102 by cooling air blown out from the cooling apparatus 150, and achieving an improvement in cooling efficiency.

Sixth Embodiment

Next, a sixth embodiment of the present invention will be described. Note that components that are the same in the sixth embodiment as in the first to fifth embodiments are assigned the same reference numerals, and descriptions thereof are omitted.

Figure 12:
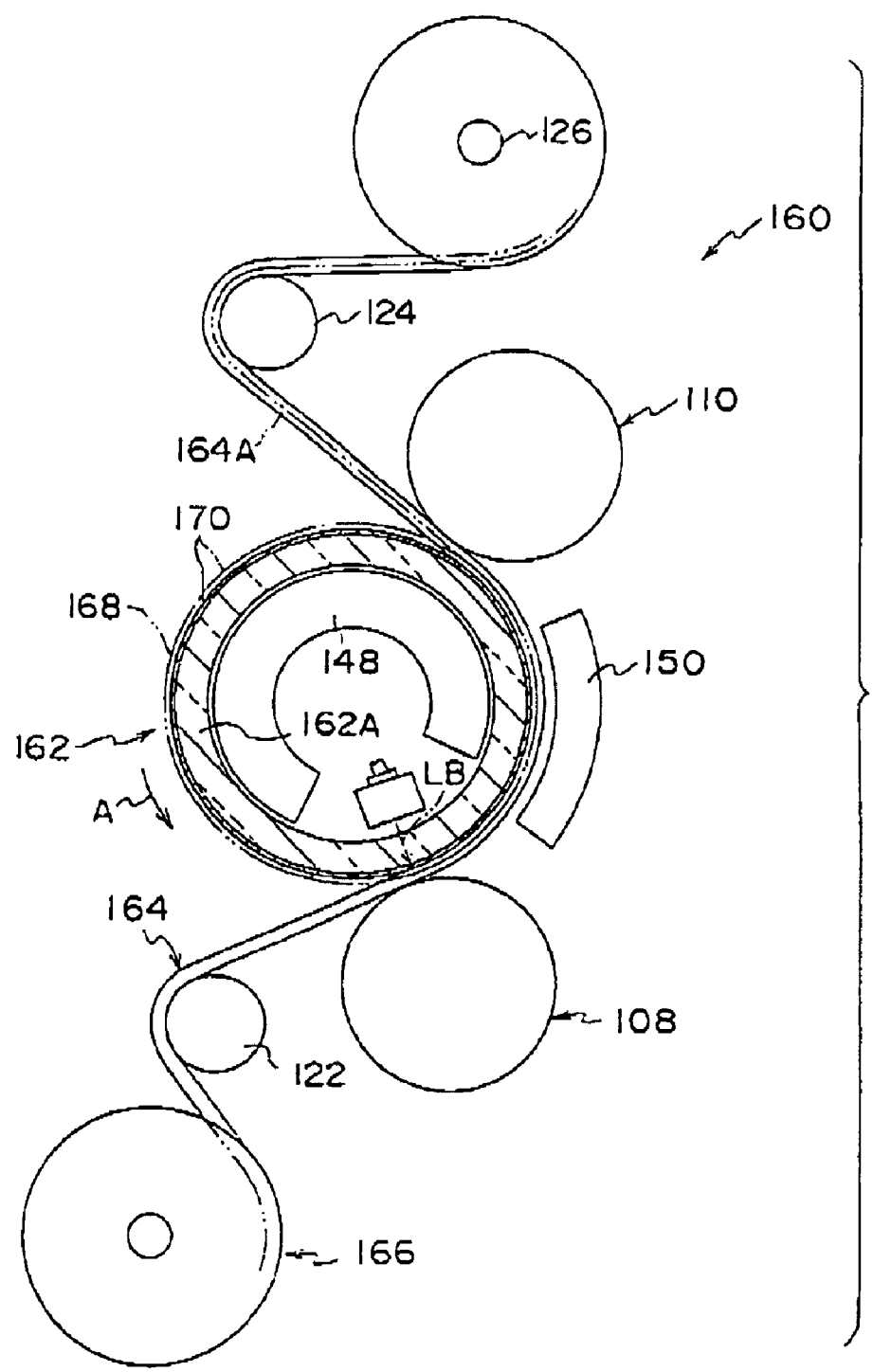
FIG. 12 is a schematic sectional view of a shape transfer device employed in a sixth embodiment.

FIG. 12 shows general structure of principal elements of a shape transfer device 160 in which the sixth embodiment is applied. This shape transfer device 160 is equipped with a transfer roller 162. The transfer roller 162 is driven to rotate in a predetermined direction (the direction of arrow A) by driving force of an unillustrated driving structure. The pressure roller 108 and the peeling roller 110 are also provided in the shape transfer device 160, opposing the transfer roller 162. A workpiece film 164, which is a web-form transfer object for implementing shape transfer, is wound around the transfer roller 162 between the pressure roller 108 and the peeling roller 110, and is conveyed.

A film roll 166, on which the workpiece film 164 is laminarly wound, is loaded in the shape transfer device 160. The workpiece film 164 is drawn out from the film roll 166 and wound around the transfer roller 162.

Similarly to the film 64 mentioned earlier, the workpiece film 164 is formed using PMMA, acrylic resin or the like, and softens when heated. Moreover, plastic deformation of the workpiece film 164 occurs when the workpiece film 164 is pressured in a softened state.

Figure 13:
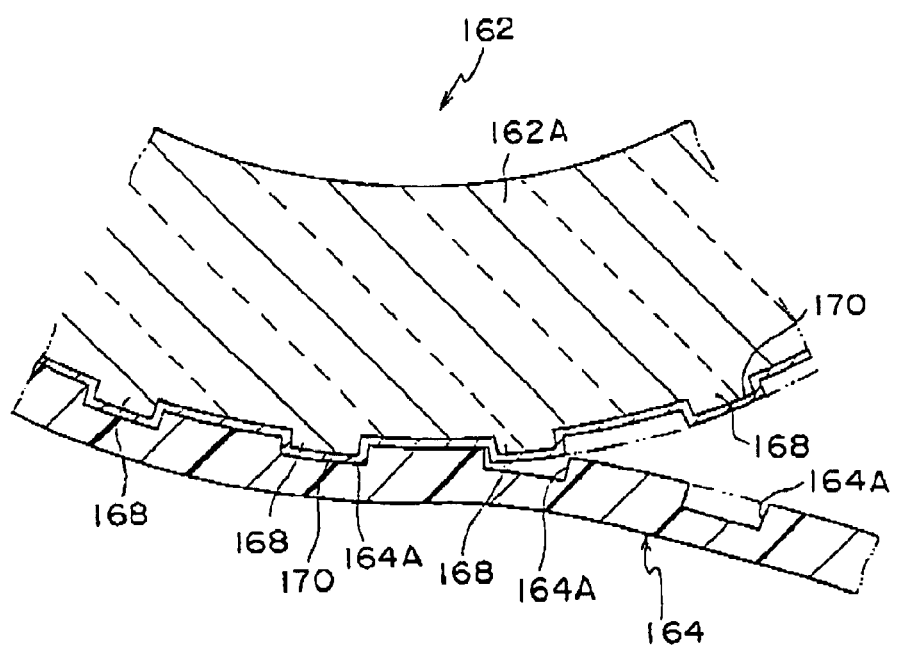
FIG. 13 is a schematic view showing shape transfer to a workpiece film.

As shown in FIGS. 12 and 13, an outer peripheral portion of the transfer roller 162 is formed in a substantially cylindrical shape by a base member 162A which employs a laser-transmissive material that transmits the laser beam LB.

Further, as shown in FIG. 13, protruding portions 168 are formed on the transfer roller 162, at an outer peripheral face of the base member 162A. These protruding portions 168 are formed at the outer peripheral face of the transfer roller 162 in a pattern corresponding to recessed portions 164A that are to be formed in the workpiece film 164.

As shown in FIG. 12, the laser head 136 is disposed at the interior of the transfer roller 162. This laser head 136 emits the laser beam LB toward a pressuring position of the workpiece film 164, which is a point of juxtaposition of the transfer roller 162 and the pressure roller 108. In this shape transfer device 160, the laser beam LB is emitted toward the protruding portions 168.

That is, synchronously with rotation of the transfer roller 162, the laser control device 146 (see FIG. 10) emits the laser beam LB from the laser head 136 in accordance with the pattern of the protruding portions 168 formed at the transfer roller 162.

As shown in FIGS. 12 and 13, a photothermal conversion layer 170 is formed at the outer peripheral face of the transfer roller 162. As shown in FIG. 13, this photothermal conversion layer 170 is formed so as to cover the protruding portions 168.

The photothermal conversion layer 170 is formed by vapor deposition of nickel or the like. When the photothermal conversion layer 170 is irradiated by the laser beam LB, the photothermal conversion layer 170 absorbs the energy of the laser beam LB and generates heat.

The base member 162A of the transfer roller 162 transmits the laser beam LB. Thus, the laser beam LB from the laser head 136 is irradiated to the photothermal conversion layer 170 covering the protruding portions 168.

The photothermal conversion layer 170 covering the protruding portions 168 is heated by the laser beam LB irradiated from the laser head 136, while the workpiece film 164 is being pressured by being nipped between the transfer roller 162 and the pressure roller 108. Thus, the surface of the workpiece film 164 that opposes the protruding portions 168 is heated.

As a result, the recessed portions 164A are continuously formed in the workpiece film 164 with a pattern corresponding to the pattern of the protruding portions 168 of the transfer roller 162.

At this shape transfer device 160, the workpiece film 164 is formed of, for example, acrylic resin. If optical members that will form organic electroluminescent light-emitting elements are to be produced using this workpiece film 164, the recessed portions 164A, at which an organic electroluminescent light-emitting layer will be provided, can be formed in the workpiece film 164 by the shape transfer device 160. Here, in a case in which the recessed portions 164A are to be formed with 100 μm by (×) 50 μm openings and depths of 30 μm, the protruding portions 168, and the photothermal conversion layer 170, are formed to be 100 μm by 50 μm with heights of 30 μm at the outer peripheral face of the transfer roller 162, with a spacing of 15 μm.

A heating temperature of the workpiece film 164 resulted from heating of the photothermal conversion layer 170 that covers the protruding portions 168 can be set to a predetermined temperature (for example, a temperature in the range from 80° C. to 120° C.) by controlling strength (output of the laser oscillator 144), beam diameter and irradiation duration (scanning rates) of the laser beam LB. Additionally, a pressure force applied on the workpiece film 164 in the shape transfer device 160 is set from 15 MPa to 30 MPa.

Thus, by implementing this pressuring and heating of the workpiece film 164, the prescribed recessed portions 164A can be formed in the surface of the workpiece film 164.

Here, because only required portions of the workpiece film 164 are heated rather than the whole face thereof being heated, an improvement in heating efficiency is available. That is, the workpiece film 164 can be heated with smaller heat amounts than in a case of heating which includes heating of the transfer roller 162.

In addition, because the whole area of the workpiece film 164 is not heated, thermal shrinkage of the workpiece film 164 can be restrained, and the recessed portions 164A can be formed with high accuracy.

Furthermore, the workpiece film 164 is cooled by the cooling apparatus 150, unnecessary heating of the workpiece film 164 is suppressed, and the base member 162A is cooled by the cooling apparatus 148. Therefore, the shape transfer cycle can be shortened, and an improvement in productivity can be achieved. In addition, no undesirable thermal effects will not be caused in the workpiece film 164, which is wound onto the winding shaft 126, whereby shape transfer to the workpiece film 164 can be carried out continuously.

Now, in the sixth embodiment, the protruding portions 168 are formed at the outer peripheral portion of the transfer roller 162 in accordance with the pattern of the recessed portions 164A to be formed in the workpiece film 164. However, a mold for transferring shaping to the workpiece film 164 is not limited thus.

For example, the protruding portions 168 may be structured by the photothermal conversion layer 170 at an outer peripheral face of a cylindrical transfer roller, or the material transfer device 100 or material transfer device 152 described above may be utilized.

Figure 14:
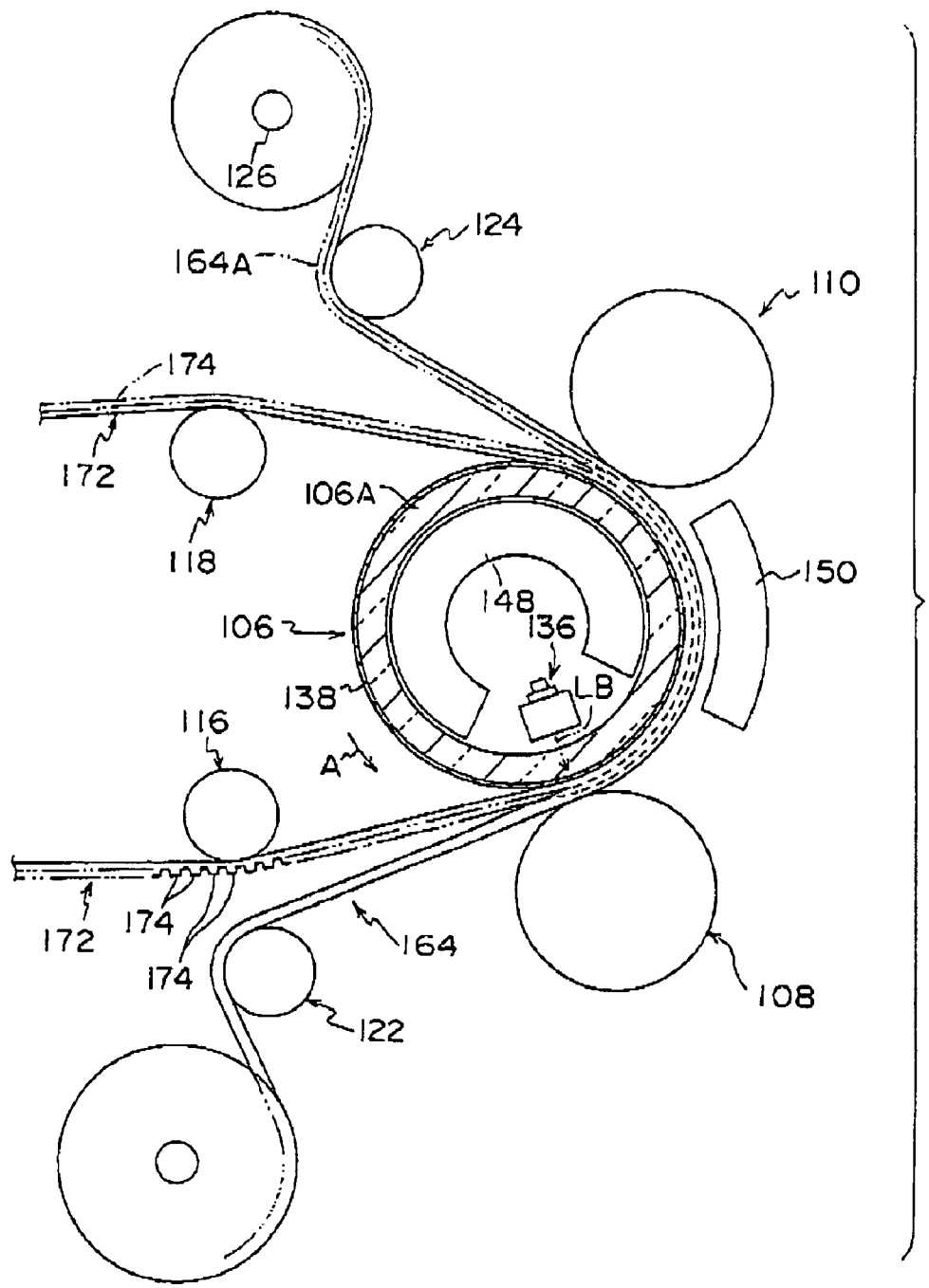
FIG. 14 is a schematic sectional view showing an example of another shape transfer device.

In such a case, as shown in FIG. 14, the workpiece film 164 is used in place of the workpiece film 102, and a mold film 172 is used in place of the donor film 104. Note that FIG. 14 shows an example in which the material transfer device 100 is redeployed, as an example.

Protruding portions 174 corresponding to the pattern to be transferred to the workpiece film 164 are formed on the mold film 172. The mold film 172 is superposed with the workpiece film 164 such that the protruding portions 174 side face of the mold film 172 faces the workpiece film 164.

The laser oscillator 144 is operated synchronously with conveyance of the mold film 172, and thus the laser beam LB heats the photothermal conversion layer 138 that opposes the protruding portions 174 of the mold film 172.

As a result, together with the protruding portions 174 of the mold film 172, regions of the workpiece film 164 that oppose the protruding portions 174 (regions at which recessed portions 174A are to be formed) can be heated.

The fifth and sixth embodiments have been described as using the laser oscillator 144, which serves as the heating structure, and the laser head 136 which emits the laser beam LB from the numerous emission apertures 140, but are not limited thus. A laser head capable of emitting one or a plurality of the laser beam LB may be used. This laser head may be structured so as to move in an axial direction of the transfer roller 106 or 162, which is a main scanning direction, and a freely selected structure which main scans the laser beam LB in accordance with a transfer pattern of the transfer material, a pattern of the protruding portions 168, or the like may be employed.

Further, the fifth and sixth embodiments have been described as carrying out material transfer or shape transfer by using laser light, but are not limited to laser light. The material transfer or shape transfer can be carried out using infra-red rays (far infra-red rays, near infra-red rays or the like) or the like.

Seventh Embodiment

Next, as a seventh embodiment, a transfer device which employs an infra-red heater instead of a laser beam will be described. Note that components that are the same in the seventh embodiment as in the first to sixth embodiments are assigned the same reference numerals, and descriptions thereof are omitted.

FIG. 15 shows general structure of the principal elements of a shape transfer device 180 in which the seventh embodiment is applied.

This shape transfer device 180 is provided with a transfer roller 182, which is formed in a substantially cylindrical shape. At peripheral neighborhoods of this transfer roller 182, pressure rollers 184A and 184B and the peeling roller 110A are disposed in this order along a direction of rotation.

The tension roller 154 is provided between the pressure rollers 184A and 184B. The pressure belt 156 is wound around the pressure rollers 184A and 184B and the tension roller 154. This pressure belt 156 is wound around the transfer roller 182 between the pressure rollers 184A and 184B.

In this shape transfer device 180, the workpiece film 164 is fed in between the transfer roller 182 and the pressure roller 184A. The workpiece film 164 is wound around the transfer roller 182 between the pressure roller 184A and the peeling roller 110A. Thus, between the pressure rollers 184A and 184B, the workpiece film 164 is nipped and pressured between the transfer roller 182 and the pressure belt 156. Note that rather than the pressure belt 156, for example, a plurality of pressure rollers could be disposed between the pressure rollers 184A and 184B so as to pressure the workpiece film 164.

A heater unit 186 is disposed at the interior of the transfer roller 182. The heater unit 186 is provided with a lamp heater 186A which emits infra-red rays IR. The heater unit 186 emits the infra-red rays IR toward the pressure roller 184A.

A ceramic, tungsten or the like may be employed for the lamp heater 186A provided at the heater unit 186. Although these infra-red rays IR generally include the wavelength of the laser light generated by the laser oscillator 144 (for example, a wavelength of 808 nm), near infra-red rays NR with a peak wavelength from 1.2 μm (1200 nm) to 2.0 μm (2000 nm), which exceeds the wavelength of the laser light, are employed in the present embodiment. Note that the infra-red rays IR are not limited to near infra-red rays with relatively short wavelengths, and longer wavelength far infra-red rays may be used.

A base member 182A of an outer peripheral portion of the transfer roller 182 is formed of an infra-red ray-transmissive material with a high transmissivity in regard to the infra-red rays IR. At an outer peripheral face of this base member 182A, the protruding portions 168 are formed in a predetermined pattern. A photothermal conversion layer 188, which is formed of a material with high absorptivity in regard to the infra-red rays IR and which generates heat by absorbing the infra-red rays IR, is also provided at the outer peripheral face of the transfer roller 182. The protruding portions 168 are covered over by this photothermal conversion layer 188.

Accordingly, the infra-red rays IR irradiated from the heater unit 186 are transmitted through the base member 182A of the transfer roller 182 and irradiated to the photothermal conversion layer 188. The photothermal conversion layer 188 generates heat when irradiated by the infra-red rays IR, and heats the workpiece film 164 that is nipped by the transfer roller 182 and the pressure roller 184A (the pressure belt 156).

Because the transfer roller 182 is provided with the protruding portions 168 protruding from the outer peripheral face of the transfer roller 182, when the workpiece film 164 is nipped between the transfer roller 182 and the pressure roller 184A, the surface of the workpiece film 164 is principally contacted with and pressured by the protruding portions 168.

At this time, because the photothermal conversion layer 188 that is irradiated by the infra-red rays IR generates heat, the workpiece film 164 is heated while being pressured by the protruding portions 168, and the recessed portions 164A are formed in accordance with the protruding portions 168.

The cooling apparatus 148 is provided at the interior of the transfer roller 182. The cooling apparatus 148 cools the photothermal conversion layer 188, which has been heated by being irradiated with the infra-red rays IR, and the base member 182A at which this photothermal conversion layer 188 is provided.

Further, a cooling apparatus 190 is provided between the pressure rollers 184A and 184B in place of the cooling apparatus 150. Similarly to the cooling apparatus 150, this cooling apparatus 190, for example, supplies cooling fluid, blows cooling air which has been cooled by this cooling fluid out toward the pressure belt 156, and thus cools the pressure belt 156 and the workpiece film 164.

This cooling apparatus 190 is disposed closer to the pressure roller 184B side, which is a downstream side in the direction of rotation of the transfer roller 182 (the conveyance direction of the workpiece film 164). Thus, the workpiece film 164 is initially cooled gently. After a predetermined time, rapid cooling is implemented using the cooling apparatus 190, and then the pressure is released.

Figure 16:
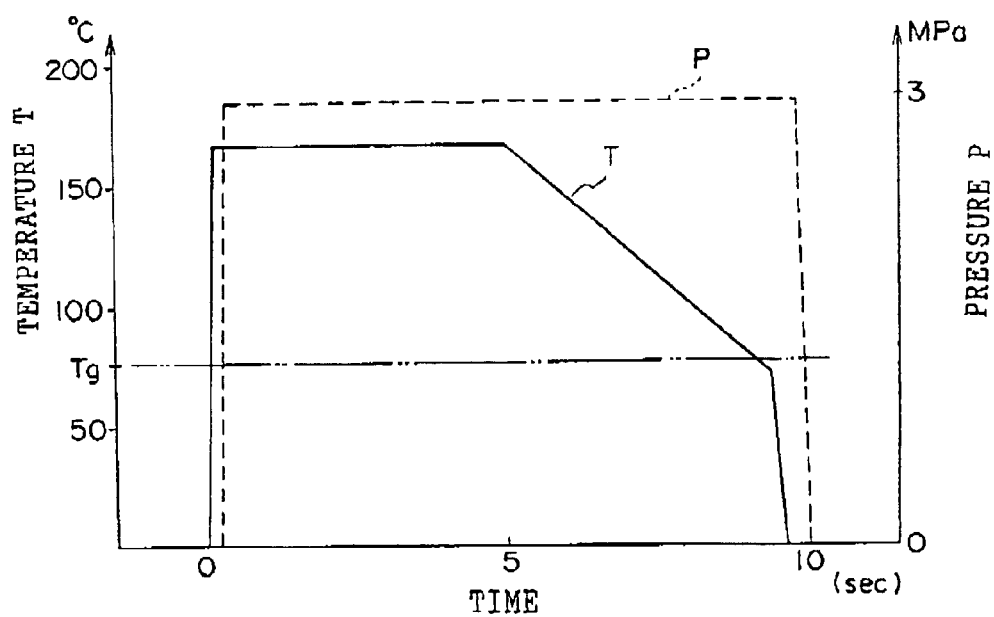
FIG. 16 is a graph showing an example of a heating profile and a pressuring profile when shape transfer is being carried out.

FIG. 16 shows general variations in temperature T and pressure (pressure force) P of the workpiece film 164 in the shape transfer device 180 which is structured as described above. Note that the temperature T and pressure P are temperature and pressure at a position that opposes one of the protruding portions 168 at the transfer roller 182.

In the state in which the photothermal conversion layer 188 opposing the pressure roller 184A is being heated by the heater unit 186, the workpiece film 164 is fed in thereto. Hence, at a time at which the temperature T of the workpiece film 164 reaches a predetermined temperature Tg (for example, 80° C.), pressuring by the protruding portions 168 formed at the transfer roller 182 commences.

Until the workpiece film 164 has passed a position opposing the pressure roller 184A, the workpiece film 164 is heated and pressured by the shape transfer device 180 so as to achieve a predetermined temperature and pressure. Then, until the workpiece film 164 has passed a position opposing the pressure roller 184B, the workpiece film 164 is maintained in a state in which a predetermined pressure is applied to the workpiece film 164 by the pressure belt 156.

Even after the workpiece film 164 has been moved past a position opposing the infra-red ray heater 186A (the position opposing the pressure roller 184A) by the rotation of the transfer roller 182, the workpiece film 164 is maintained at substantially the predetermined temperature, due to the occurrence of temperature rises in the photothermal conversion layer 188 and the base member 182A of the transfer roller 182 and the like.

As a result, the workpiece film 164 is reliably softened at portions that oppose the protruding portions 168, and the recessed portions 164A are formed in accordance with the protruding portions 168. Here, because it is principally portions of the workpiece film 164 that oppose the protruding portions 168 that are heated, rather than the whole face of the workpiece film 164, unnecessary temperature rises over the whole face of the workpiece film 164 can be suppressed.

Thereafter, cooling of the base member 182A and the photothermal conversion layer 188 by the cooling apparatus 148 is commenced, and thus the temperature of the workpiece film 164 gradually falls. Here, because temperature rises of the transfer roller 182 occur only at portions of the photothermal conversion layer 188, the required heat amounts are small. Therefore, the base member 182A and the photothermal conversion layer 188 can be reliably cooled before again reaching the position of irradiation by the infra-red rays IR.

In the shape transfer device 180, because the cooling apparatus 190 is disposed closer to the pressure roller 184B side, cooling of the workpiece film 164 by the cooling apparatus 190 commences at a time at which the temperature T of the workpiece film 164 reaches the temperature Tg.

Hence, the temperature T of the workpiece film 164 falls rapidly. At a time at which the temperature T has fallen to ambient temperature, the workpiece film 164 passes the position opposing the pressure roller 184B and the pressuring is released.

Thus, with the shape transfer device 180, by controlling the temperature and pressure of the workpiece film 164 in the transfer process, accurate and reliable shape transfer can be implemented.

That is, with the shape transfer device 180, by specifying a pressure profile and temperature profile of the transfer process appropriately for the transfer object and the like, and implementing heating and pressuring processing in accordance with the specified pressure profile and temperature profile, high quality shape transfer can be implemented.

The temperature profile herein can be adjusted by altering position, number and spacing of light sources, which are a heat source for the heating, positions of cooling structures and the like, and so forth. The pressure profile can be specified to an appropriate profile by adjusting numbers and positions of pressure rollers, positions and pressures of individual rollers and pressure belts, and so forth.

If the temperature at the time when heating commences varies, the heating temperature also varies. However, because reliable cooling is enabled before the time at which heating is commenced, accurate control of the heating temperature is possible.

Note that, although an example of shape transfer has been described for the seventh embodiment, the seventh embodiment may be applied to material transfer. That is, by suitably specifying a pressuring profile and heating profile (temperature profile) between a transfer material and a transfer object when material transfer is to be carried out, reliable material transfer can be implemented with high accuracy.

Moreover, although the seventh embodiment employs the heater unit 186 which emits the infra-red rays IR as the light source, a light source which emits a laser beam LB for heating is also possible.

That is, by specifying a heating profile and pressuring profile so as to obtain appropriate material transfer or shape transfer when laser light is used to heat a transfer object, and carrying out the material transfer/shape transfer on the basis of the specified heating profile and pressuring profile, high quality material transfer/shape transfer is possible.

The embodiments described above (the first to seventh embodiments) are not limiting to structures of the present invention. For example, in the fifth to seventh embodiments, the photothermal conversion layer is formed at the outer peripheral portion of the transfer roller, and the transfer object is heated together with the transfer material or mold member by heating this photothermal conversion layer. However, the present invention is not limited thus. For example, if material transfer is to be carried out, the photothermal conversion layer may be formed at the temporary support 130, at which the transfer material layer 132 is provided, or the like. Further, if shape transfer is to be carried out using the mold film 172 or the like, a photothermal conversion layer may be formed at a support which is provided with the protruding portions 168.

In the aforementioned embodiments, the present invention has been described principally for examples of material transfer and shape transfer for forming organic electroluminescent light-emitting elements. However, the present invention is not limited thus, and can be applied to material transfer and/or shape transfer when forming liquid crystal displays, and to material transfer/shape transfer when forming separation ribs of a color filter and the like. Further still, the present invention is not limited to these, and can be applied to material transfer applications for transferring various transfer materials to transfer objects with sheet forms, web forms and the like, and to various kinds of shape transfer such as transfer of embossment patterns to transfer objects with sheet forms, web forms and the like.

Eighth Embodiment

Next, an eight embodiment of the present invention will be described. Note that components that are the same in the eighth embodiment as in the first to seventh embodiments are assigned the same reference numerals, and descriptions thereof are omitted.

Figure 17:
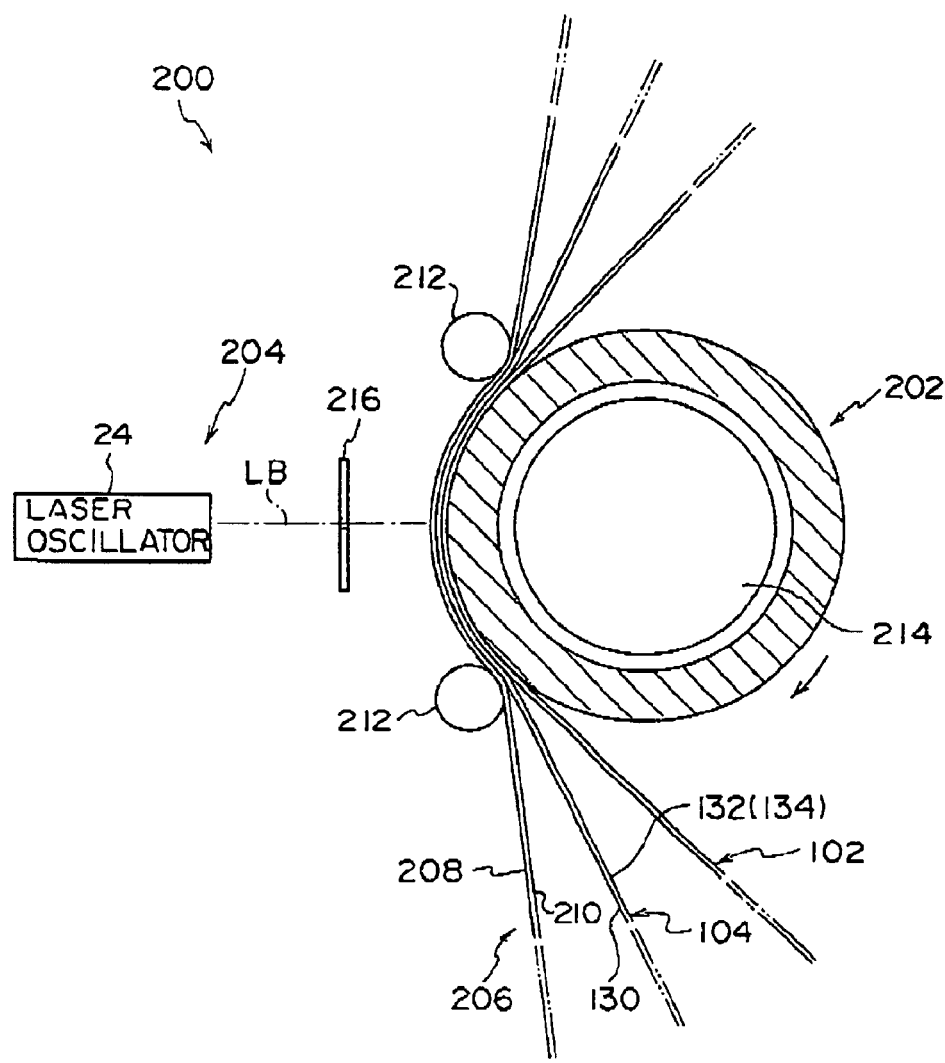
FIG. 17 is a schematic view showing basic structure of a transfer device employed in an eighth embodiment.

FIG. 17 shows basic structure of principal elements of a transfer device (a material transfer device) 200 which is employed in the eighth embodiment. The transfer device 200 is equipped with a cooling roller 202, which serves as a winding roller.

Figure 18:
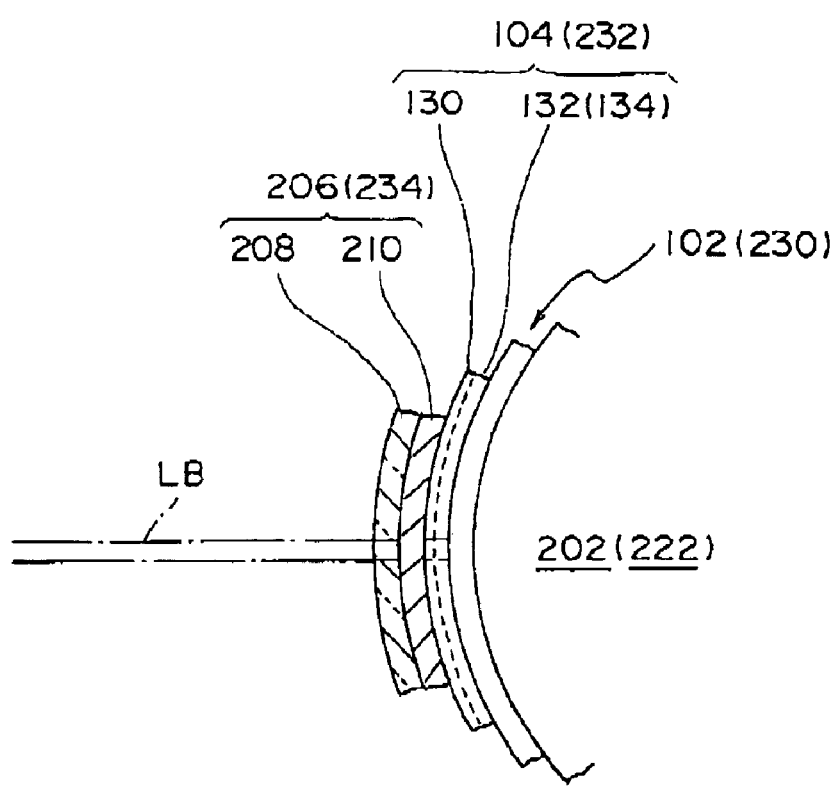
FIG. 18 is a schematic view of principal components, showing disposition of a work film, a donor film and a heat generation sheet on a cooling roll.

As shown in FIGS. 17 and 18, the workpiece film 102 and the donor film 104 are wound on at the cooling roller 202. The workpiece film 102 is a film-form substrate which serves as the transfer object. At the donor film 104, the transfer material layer 132 is formed at one face of the temporary support 130.

As shown in FIG. 18, the donor film 104 is superposed with the workpiece film 102 such that the transfer material layer 132 of the donor film 104 faces the workpiece film 102, with the workpiece film 102 at the cooling roller 202 side. Consequently, transfer to the workpiece film 102 of the transfer material 134, which forms the transfer material layer 132, is possible.

Further, as shown in FIG. 17, a heating head 204 is provided at the transfer device 200. The heating head 204 employs the laser oscillator 24 or the like, and opposes the cooling roller 202. This heating head 204 emits, for example, a laser beam LB with a predetermined wavelength, which is generated by the laser oscillator 24, toward the donor film 104 wound around the cooling roller 202. Here, at the heating head 204, the laser beam LB is focused so as to have a predetermined spot diameter.

As shown in FIG. 17, a heat generation film 206, which is a heat generation member, is superposed with the donor film 104 that is wound around the cooling roller 202, and is wound on the cooling roller 202. The workpiece film 102, the donor film 104 and the heat generation film 206 are integrally conveyed, and the laser beam LB is irradiated at the heat generation film 206.

As shown in FIG. 18, the heat generation film 206 is structured by a flexible base member 208 and a photothermal conversion layer 210. The flexible base member 208 is formed in a web form with a predetermined width to serve as a support member. The photothermal conversion layer 210 is provided at one face of this flexible base member 208. The heat generation film 206 is superposed with the donor film 104, with the photothermal conversion layer 210 facing the donor film 104.

The flexible base member 208 is formed using a light-transmissive material such as PET, PEN, TAC, PES or the like so as to have a thickness of the order of, for example, 30 $\mu$m to 500 $\mu$m. Thus, the flexible base member 208 is endowed with flexibility, and the flexible base member 208 can be made to closely contact the donor film 104 when the flexible base member 208 is wound on at the cooling roller 202 with the donor film 104. Moreover, because the flexible base member 208 uses a light-transmissive material, the flexible base member 208 transmits the laser beam LB irradiated from the heating head 204.

This flexible base member 208 is not limited to light-transmissive materials such as PET, PEN, TAC, PES and the like. Any freely selected material may be used as long as characteristics thereof include high transmissivity of the laser beam LB and flexibility.

The photothermal conversion layer 210 is formed at the flexible base member 208 by vapor deposition or the like such that a thickness thereof is thin, in the vicinity of 0.1 $\mu$m to 1.0 $\mu$m, using Ni, Cr, Al, Cu, Ag, Au or the like. By setting the thickness of the photothermal conversion layer 210 to the above range, impairment of the flexibility of the flexible base member 208 can be prevented. The photothermal conversion layer 210 is not limited to these materials. Any freely selected material that has high absorptivity of the laser beam LB (for example, a transmissivity of not more than 15%) and which generates heat by absorbing the laser beam LB may be used.

As shown in FIG. 17, in the transfer device 200, nipping rollers 212 are disposed facing the cooling roller 202. The nipping rollers 212 sandwich a position of irradiation by the laser beam LB, being provided at an upstream side and a downstream side in a direction of rotation of the cooling roller 202 (the direction of an arrow in FIG. 17). The workpiece film 102, the donor film 104 and the heat generation film 206 are wound around the cooling roller 202 between the nipping rollers 212.

The nipping rollers 212 grip the workpiece film 102, the donor film 104 and the heat generation film 206 integrally between the nipping rollers 212 and the cooling roller 202. Thus, the nipping rollers 212 cause the workpiece film 102, the donor film 104 and the heat generation film 206 to closely contact one another, and prevent the occurrence of mispositioning.

Moreover, a predetermined tension is applied to the heat generation film 206, so that the workpiece film 102 and donor film 104 are subjected to pressuring between the nipping rollers 212.

The cooling roller 202 is formed in a substantially tubular shape, whose interior is hollow. A cooling apparatus 214 is formed in a substantially circular column shape at this hollow interior. The cooling apparatus 214 is disposed so as to be relatively rotatable. When supplied with, for example, cooling water, this cooling apparatus 214 cools an outer peripheral portion of the cooling roller 202, and keeps the outer peripheral portion in a predetermined temperature range.

As a result, the occurrence of temperature rises in the workpiece film 102 and the like that are wrapped around the cooling roller 202 is suppressed, and rapid cooling when a temperature rise has occurred is enabled. Note that the cooling apparatus 214 is illustrated as an example of a cooling structure; the cooling structure is not limited to the cooling apparatus 214, and a freely selected structure can be employed.

In the transfer device 200 that is structured thus, the donor film 104 at which the transfer material layer 132 is formed and the heat generation film 206 at which the photothermal conversion layer 210 is provided are superposed with the workpiece film 102, which is the transfer object, and wound around the cooling roller 202. At this time, the predetermined tension is applied to the heat generation film 206, and thus the workpiece film 102, the donor film 104 and the heat generation film 206 are nipped by the cooling roller 202 and the nipping rollers 212 at a start position and a finish position of the winding onto the cooling roller 202.

Thus, the workpiece film 102, donor film 104 and heat generation film 206 are tightly contacted to one another, and pressure is applied between the workpiece film 102 and the donor film 104.

The heating head 204 emits the laser beam LB toward the heat generation film 206 that is wound around the cooling roller 202. At the heat generation film 206, this laser beam LB passes through the flexible base member 208 and is irradiated to the heat generation film 206. Here, the heating head 204 focuses the laser beam LB so as to have a predetermined spot diameter at the photothermal conversion layer 210.

The photothermal conversion layer 210 absorbs energy of the irradiated laser beam LB, and a portion irradiated by the laser beam LB generates heat and heats the transfer material layer 132 provided at the donor film 104. The transfer material layer 132 of the donor film 104 is fused by being heated, and heated portions thereof become easy to detach. At this time, because pressure is being applied between the workpiece film 102 and the donor film 104, the transfer material layer 132 (the transfer material 134) that is fused transfers to the workpiece film 102.

Meanwhile, the cooling apparatus 214 is provided inside the cooling roller 202, and the outer peripheral portion of the cooling roller 202 is kept in the predetermined temperature range by the cooling apparatus 214.

As a result, thermal conduction at the transfer material layer 132 is suppressed, and the transfer material 134 is transferred to the workpiece film 102 at a scale corresponding to the spot diameter of the laser beam LB. Furthermore, although the photothermal conversion layer 210 is heated by the laser beam LB together with the transfer material 134 that is to be transferred to the workpiece film 102, the photothermal conversion layer 210 is rapidly cooled by the cooling roller 202.

Here, because the transfer device 200 heats only a portion of the photothermal conversion layer 210 that is irradiated by the laser beam LB and only the transfer material layer 132 that opposes this heated portion is heated, heat amounts are small. Therefore, the transfer material layer 132 is rapidly cooled by the cooling roller 202 in a short time.

Thus, mispositioning or the like will not be caused to the transfer material 134 that is transferred to the workpiece film 102 when the donor film 104 passes the nipping roller 212 that is provided at the downstream side, relative to the position of irradiation by the laser beam LB in the rotation direction of the cooling roller 202, and the donor film 104 is peeled from the workpiece film 102; the transfer material 134 that has been transferred to the workpiece film 102 will not be peeled off from the workpiece film 102 at this time; and material transfer with a short transfer cycle is enabled.

Here, a semiconductor laser with a wavelength of 808 nm is employed as the laser oscillator 24. This semiconductor laser irradiates the laser beam LB in pulses, with a spot diameter of 400 $\mu$m at the transfer material layer 132, and the irradiation of the laser beam LB ceases when the transfer material layer 132 reaches 80° C. to 120° C.

Accordingly, the transfer material 134 can be transferred to the workpiece film 102 in accordance with the spot diameter of the laser beam LB without causing heat damage or the like to components forming the transfer material 134.

Further still, as shown in FIG. 17, a mask 216 is disposed in an optical path of the laser beam LB. An aperture (not shown) of, for example, 100 $\mu$m by 100 $\mu$m is formed in the mask 216. The laser beam LB passes through this aperture of the mask 216 and is irradiated at the photothermal conversion layer 210.

Accordingly, the transfer material 134 can be transferred to the workpiece film 102 at a scale substantially the same as the aperture of the mask 216 (around 100 $\mu$m by 100 $\mu$m).

With the transfer device 200 that is structured thus, the laser beam LB may be irradiated in accordance with a pattern of the transfer material 134 that is to be formed at the workpiece film 102 while the heating head 204 is moving. Accordingly, the transfer material 134 can be transferred to the workpiece film 102 in a desired pattern.

Ninth Embodiment

Next, a ninth embodiment of the present invention will be described. Note that components that are the same in the ninth embodiment as in the first to eighth embodiments are assigned the same reference numerals, and descriptions thereof are omitted.

Figure 19:
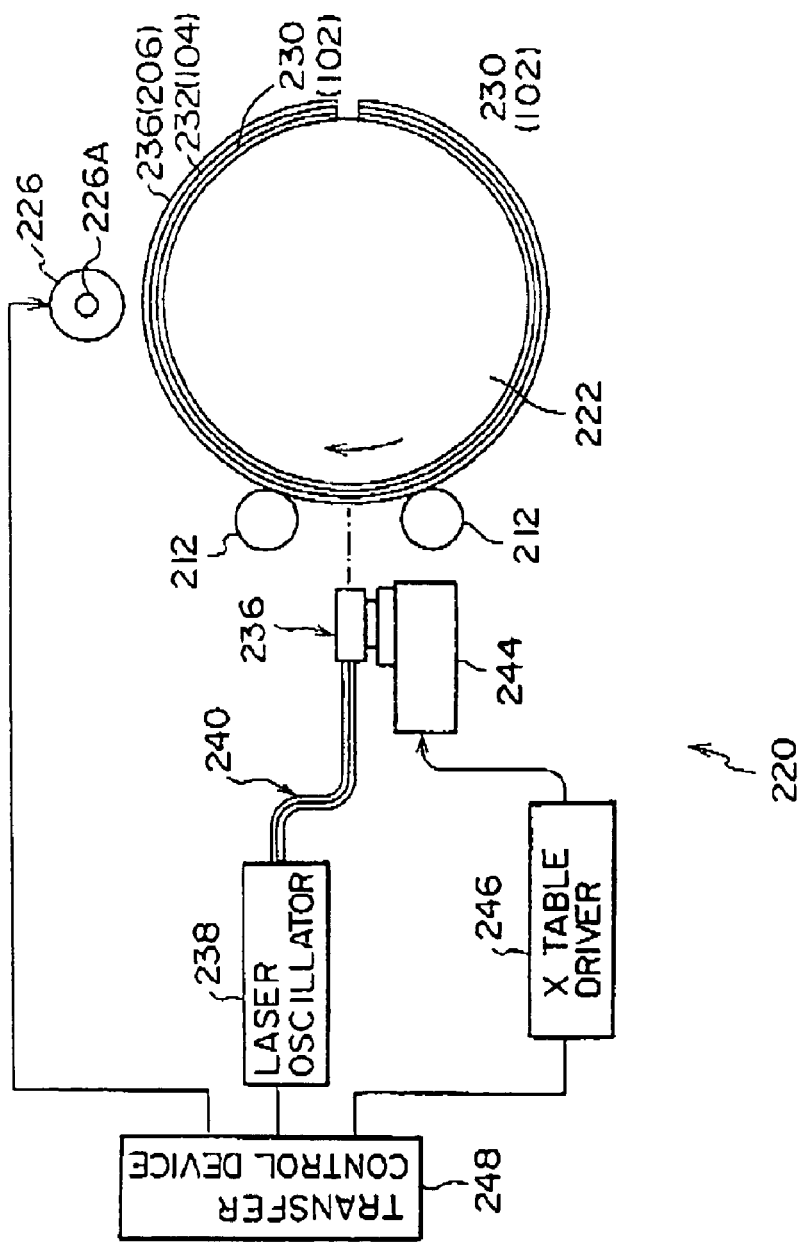
FIG. 19 is a schematic structural view of principal components of a transfer device employed in a ninth embodiment.
Figure 20:
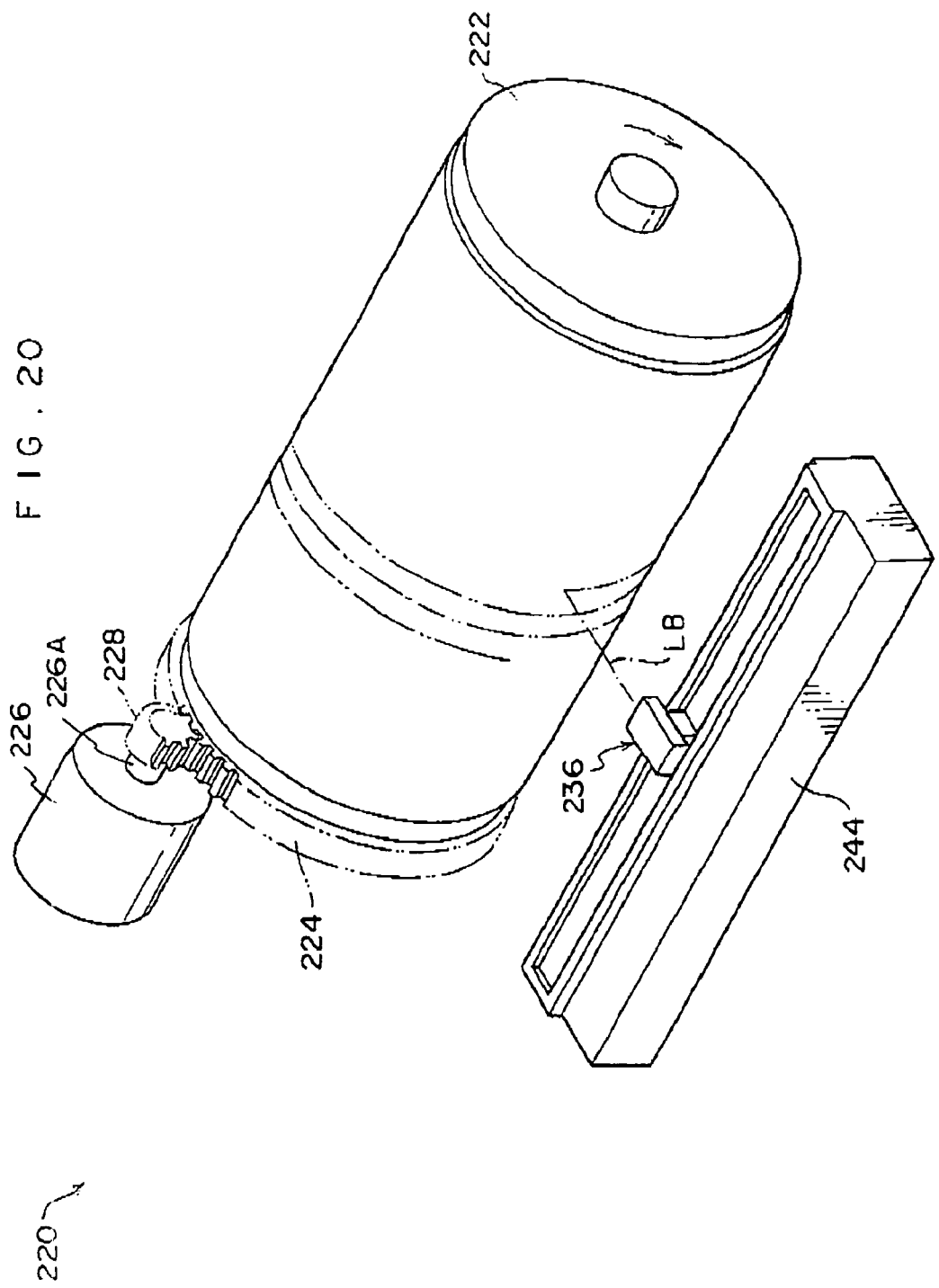
FIG. 20 is a schematic perspective view of principal components of the transfer device shown in FIG. 19.

FIGS. 19 and 20 show general structure of a transfer device (a material transfer device) 220 which is employed in the ninth embodiment.

A cooling drum 222 is provided at the transfer device 220. This cooling drum 222 is provided with a cooling structure (not shown), such as the aforementioned cooling apparatus 214 or the like, inside the cooling drum 222. An outer peripheral portion of the cooling drum 222 is cooled and kept in a predetermined temperature range by this cooling structure.

As shown in FIG. 20, this cooling drum 222 is provided with a gear 224 at one end portion in an axial direction thereof. A gear 228 meshes with this gear 224. The gear 228 is mounted at a driving shaft 226A of a driving motor 226.

Thus, the transfer device 220 is structured such that, when the driving motor 226 drives, the cooling drum 222 rotates at a predetermined rotation speed. Note that the gears 224 and 228 are not shown in FIG. 19.

At this cooling drum 222, a sheet substrate 230, which is a transfer object, is superposed with a donor sheet 232 and a heat generation sheet 234 and wound around the cooling drum 222. For the sheet substrate 230, a sheet of the workpiece film 102 that has been cut to a predetermined size may be utilized. Further, as the donor sheet 232 and the heat generation sheet 234, sheets of the donor film 104 and the heat generation film 206 that have been cut in accordance with the size of the sheet substrate 230 may be utilized.

That is, whereas the transfer device 200 described for the eighth embodiment uses the web-form heat generation film 206 to transfer the transfer material 134 of the web-form donor film 104 to the web-form workpiece film 102, the transfer device 220 uses a heat generation sheet to transfer the transfer material 134 to a sheet-form transfer object.

As shown in FIG. 19, the sheet substrate 230 is wound on the cooling drum 222 with a face thereof to which the transfer material 134 is to be transferred facing to the outer side. The donor sheet 232 is superposed with the sheet substrate 230 and wound on in a state in which the transfer material layer 132 of the donor sheet 232 faces to the sheet substrate 230 side thereof. The heat generation sheet 234 is superposed with the donor sheet 232 and wound on with the photothermal conversion layer 210 side of the heat generation sheet 234 facing to the donor sheet 232 side thereof.

At the cooling drum 222, the nipping rollers 212 are disposed facing the cooling drum 222. The sheet substrate 230, donor sheet 232 and heat generation sheet 234 are nipped between the nipping rollers 212 and the cooling drum 222, and the sheet substrate 230, donor sheet 232 and heat generation sheet 234 are rotated integrally.

Here, a predetermined tension is applied to the heat generation sheet 234, which is an outermost layer As a result, the sheet substrate 230, the donor sheet 232 and the heat generation sheet 234 are closely contacted with one another and pressure is applied between the sheet substrate 230 and the donor sheet 232. Note that a freely selected fixing method can be employed for mounting the sheet substrate 230, the donor sheet 232 and the heat generation sheet 234 at the cooling drum 222.

A laser head 236 and a laser oscillator 238 are provided at the transfer device 220. The laser head 236 is connected to the laser oscillator 238 by a plurality of optical fiber cables 240.

Figure 21:
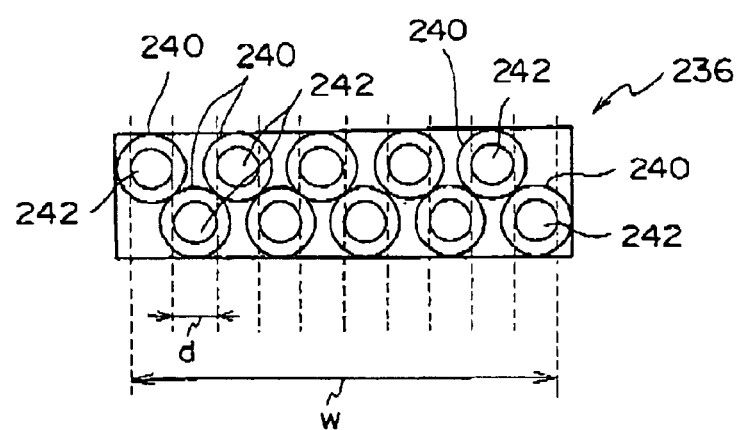
FIG. 21 is a schematic view showing emission apertures of a laser head employed in the ninth embodiment.

As shown in FIG. 19, the laser head 236 opposes the cooling drum 222 between the nipping rollers 212. As shown in FIG. 21, respective distal ends of the optical fiber cables 240 open out at the laser head 236 to serve as emission apertures 242 for a laser beam LB. These apertures are oriented toward the cooling drum 222 (not shown in FIG. 21).

The laser oscillator 238 generates the laser beam LB with a predetermined wavelength and is capable of selectively branching the generated laser beam LB into the plurality of optical fiber cables 240 for irradiation.

Accordingly, the laser beam LB that is generated by the laser oscillator 238 can be emitted toward the cooling drum 222 respectively from the plurality of emission apertures 242 formed in the laser head 236. Here, the laser beam LB emitted from the laser head 236 is focused so as to be irradiated at the photothermal conversion layer 210 of the heat generation sheet 234, which is wrapped round the cooling drum 222, with a predetermined spot diameter.

In the present embodiment, as an example, ten of the optical fiber cables 240 are employed, with an interior diameter d of the emission apertures 242 being 100 $\mu$m. By disposing the emission apertures 242 to be very close to one another at the laser head 236, it is possible to irradiate the laser beam LB in a line form or to freely selected positions in a range with a width W of 1 mm. Here, the laser head 236 is disposed with a width direction thereof along the axial direction of the cooling drum 222 (see FIG. 20).

As shown in FIGS. 19 and 20, an X-table 244 is provided at the transfer device 220. The laser head 236 is mounted at this X-table 244. As shown in FIG. 20, the X-table 244 is connected to an X-table driver 246. The X-table 244 is driven by the X-table driver 246, and moves the laser head 236 along the axial direction of the cooling drum 222.

Thus, in the transfer device 220, irradiation of the laser beam LB to freely selected positions of the heat generation sheet 234 mounted at the cooling drum 222 is enabled by rotation of the cooling drum 222 and movement of the laser head 236.

Specifically, as shown in FIG. 20, it is possible to irradiate the laser beam LB at an outer peripheral face of the cooling drum 222 in a helical form by moving the laser head 236 in the axial direction of the cooling drum 222 while the cooling drum 222 is rotating.

As shown in FIG. 19, a transfer control device 248 is provided at the transfer device 220. This transfer control device 248 controls rotation of the driving motor 226 and movement, using the X-table 244, of the laser head 236, and controls emission of the laser beam LB from the laser oscillator 238.

In the transfer device 220 that is structured thus, in the state in which the sheet substrate 230, which is the transfer object of the transfer material 134, the donor sheet 232, at which the transfer material 134 is provided, and the heat generation sheet 234 are superposed, wound on and mounted at the cooling drum 222, the cooling drum 222 rotates at the predetermined rotation speed.

In accordance therewith, the transfer control device 248 operates the laser oscillator 238 synchronously with the rotation of the cooling drum 222 while moving the laser head 236 along the axial direction of the cooling drum 222, and emits the laser beam LB from the laser head 236 toward the heat generation sheet 234.

At this time, by operating the laser oscillator 238 on the basis of a pattern of transfer of the transfer material 134 to the sheet substrate 230, which has been specified beforehand, the transfer control device 248 can irradiate the laser beam LB at the heat generation sheet 234 on the cooling drum 222 in accordance with this transfer pattern.

The heat generation sheet 234, which is irradiated by the laser beam LB, is formed of the light-transmissive flexible base member 208 and the photothermal conversion layer 210. The laser beam LB passes through the flexible base member 208 and is irradiated at the photothermal conversion layer 210.

When irradiated by the laser beam LB, a position of the photothermal conversion layer 210 that is irradiated by the laser beam LB is heated, heats the transfer material layer 132 of the donor sheet 232 that opposes the heated position, and fuses the transfer material layer 132. Further, because pressure is being applied between the sheet substrate 230 and the donor sheet 232, the fused transfer material 134 of the transfer material layer 132 transfers onto the sheet substrate 230.

Here, the transfer material layer 132 is heated only at a portion that opposes the photothermal conversion layer 210 that is irradiated by the laser beam LB, and the transfer material layer 132 is cooled by the cooling drum 222. Therefore, transmission of heat to surroundings of the transfer material layer 132 is suppressed.

Accordingly, the transfer material 134 is transferred to the sheet substrate 230 at a scale substantially the same as the spot diameter of the laser beam LB. Furthermore, because the outer peripheral portion of the cooling drum 222 is being constantly cooled, the transfer material 134 that is transferred is rapidly cooled. Hence, transfer failures such as mispositioning and the like do not occur, and material transfer with a short transfer cycle is enabled.

Further, because the photothermal conversion layer 210 of the heat generation sheet 234 that is irradiated by the laser beam LB is also cooled by the cooling drum 222, continuous transfer of the transfer material 134 is enabled.

Now, examples of material transfer have been described for the eighth and ninth embodiments. However, the structures of the transfer devices 200 and 220 can also be employed for shape transfer. At times of application to shape transfer, the mold film 172 may be utilized instead of the donor film 104. A mold sheet, wherein the mold film 172 is cut to a predetermined size, may be utilized instead of the donor sheet 232. The laser beam LB may be irradiated towards prominent portions 268. However, it may be necessary to adjust pressure forces and cooling timings.

Note that structures of the present invention are not limited to the embodiments described above (the first to ninth embodiments). For the present embodiments, examples of material transfer and shape transfer for forming organic electroluminescent light-emitting elements have been described. However, the present invention is not limited thus, and can be applied to material transfer and/or shape transfer when forming liquid crystal displays, and to material transfer/shape transfer when forming color filter separation ribs and the like. Further still, the present invention is not limited to these, and can be applied to material transfers for transferring various transfer materials to transfer objects with sheet forms, web forms and the like, and to various kinds of shape transfer such as transfer of embossment patterns and the like to transfer objects with sheet forms, web forms and so forth.

Effects of the Invention

According to the present invention as described above, a photothermal conversion layer is formed at a pressuring structure which is formed of a light-transmissive material, and material transfer and/or shape transfer is carried out while the photothermal conversion layer is selectively heated by light irradiated from a light source. Accordingly, excellent effects are obtained in that heat amounts are restrained, heating is efficient and a transfer cycle can be shortened.

Further, in the present invention, the photothermal conversion layer is provided at an upper side pressuring structure and this upper side pressuring structure is formed of a material which transmits laser light. Thus, there is no need for a photothermal conversion layer and a transfer material to be provided integrally at a donor sheet.

Moreover, according to a transfer device of the present invention, high accuracy material transfer or shape transfer to a web-form transfer object can be carried out continuously. Thus, the material transfer or shape transfer can be implemented with high quality and high productivity.

What is claimed is:

1. A transfer material transfer method for transferring a transfer material to a transfer object by superposing the transfer material with the transfer object and nipping and heating the superposed transfer material and transfer object between pressuring structures disposed in opposition, the process comprising the steps of:

forming one of the pressuring structures of light-transmissive material;

forming a photothermal conversion layer which absorbs light emitted from a light source and generates heat, at a face of the one pressuring structure which is at a transfer material side thereof;

forming a temporary support layer between the photothermal conversion layer and the transfer material;

pressuring the transfer object together with the transfer material between the opposing pressuring structures; and during the step of pressuring, irradiating the light emitted from the light source to the photothermal conversion layer from the light-transmissive material side of the photothermal conversion layer, to heat the transfer material for transferring the transfer material to the transfer object.

2. A shape transfer method for forming recessed portions in a shape transfer object, the shape transfer object being nipped between pressuring structures disposed in opposition, a mold member being disposed between one of the pressuring structures and the shape transfer object, and the recessed portions being formed by a thermal transfer process in accordance with protruding portions of a predetermined pattern which are formed at the mold member, the process comprising the steps of:

forming the one pressuring structure of light-transmissive material which transmits light of a predetermined wavelength;

forming a photothermal conversion layer between the mold member and the shape transfer object to generate heat when irradiated with light of a predetermined wavelength, said photothermal conversion layer having protruding portions for contacting a surface of the shape transfer object, pressuring the shape transfer object between the opposing pressuring structures by the mold member; and during the step of pressuring, irradiating light emitted from a light source to the photothermal conversion layer from the one pressuring structure side of the photothermal conversion layer for heating the photothermal conversion layer, heating the shape transfer object, and forming a pattern of the recessed portions in the shape transfer object in accordance with the protruding portions of the mold member.

3. A transfer material transfer method for transferring a transfer material by a thermal transfer process, the transfer material being superposed with a transfer object and nipped between an upper side pressuring structure and a lower side pressuring structure, the process comprising the steps of:

forming the upper side pressuring structure of laser-transmissive material;

forming a photothermal conversion layer, which is heated by laser light, at a face of the upper side pressuring structure which is at a transfer material side thereof;

forming a temporary support layer between the photothermal conversion layer and the transfer material;

pressuring the transfer object together with the transfer material between the upper side pressuring structure and the lower side pressuring structure; and during the step of pressuring, generating laser light from a laser oscillating structure and irradiating the laser light to the photothermal conversion layer, to heat the transfer material for transferring the transfer material to the transfer object.

4. The transfer material transfer process of claim 3, wherein the step of irradiating the laser light comprises irradiating the laser light from the laser oscillating structure to the photothermal conversion layer in correspondence with a pattern of the transfer material that is to be formed at a surface of the transfer object.

5. The transfer material transfer process of claim 3, wherein a cooling structure is provided at the lower side pressuring structure or at both the upper side pressuring structure and the lower side pressuring structure.

6. The transfer material transfer process of claim 3, further comprising the step of forming protruding portions at the transfer material side face of the upper side pressuring structure in correspondence with a pattern of the transfer material that is to be formed at a surface of the transfer object, wherein the step of generating and irradiating the laser light includes irradiating the laser light to the photothermal conversion layer that is disposed at the protruding portions.

7. The transfer material transfer process of claim 3, wherein the upper side pressuring structure is formed of quartz glass.

8. The transfer material transfer process of claim 3, wherein the photothermal conversion layer is formed of nickel.

9. A shape transfer method for forming recessed portions in a shape transfer object, the shape transfer object being nipped between an upper side pressuring structure and a lower side pressuring structure, and the recessed portions being formed by a thermal transfer process in accordance with protruding portions of a predetermined pattern, which are provided at a mold member which forms the upper side pressuring structure, the process comprising the steps of:

forming the mold member of light-transmissive material, which transmits light of a predetermined wavelength;

forming a photothermal conversion layer, which generates heat when irradiated with light of the predetermined wavelength, at a face of the mold member which is at the shape transfer object side thereof;

pressuring the shape transfer object together with the transfer material between the upper side pressuring structure and the lower side pressuring structure; and during the step of pressuring, irradiating the light of the predetermined wavelength from a light source, which is disposed to face the mold member, for heating the photothermal conversion layer, heating the shape transfer object, and forming a pattern of the recessed portions in the shape transfer object in accordance with the protruding portions of the mold member.

10. The shape transfer process of claim 9, wherein the light source comprises a heating light source which emits near infra-red rays.

11. The shape transfer process of claim 9, wherein the light source comprises a laser oscillating structure which emits a laser beam of the predetermined wavelength.

12. The shape transfer process of claim 11, wherein the laser oscillating structure irradiates, while scanning, the laser beam toward the protruding portions formed at the mold member.

13. The shape transfer process of claim 9, wherein a cooling structure is provided at the lower side pressuring structure, or at both the upper side pressuring structure and the lower side pressuring structure.

14. A transfer material transfer method for transferring a transfer material to a web-form transfer object by superposing, heating and pressuring the transfer material with the transfer object, the process comprising the steps of:

provided a photothermal conversion layer, which absorbs light irradiated from a light source and generates heat, at an outer peripheral face of a transfer roller which is formed in a cylindrical shape, light-transmissive material being used as a base member of an outer peripheral portion of the transfer roller;

superposing the transfer object with the transfer material;

winding the superposed transfer object round the photothermal conversion layer;

conveying the superposed and wound transfer object;

during the step of conveying, pressuring the transfer object together with the transfer material between the transfer roller and a pressure roller;

during the step of pressuring, irradiating light emitted from a light source, which is provided at an interior of the transfer roller, toward the photothermal conversion layer for heating the photothermal conversion layer in accordance with a pattern of the transfer material that is to be transferred to the transfer object; and allowing the heated photothermal conversion layer to heat the transfer material for transferring the transfer material to the transfer object.

15. The transfer material transfer process of claim 14, wherein, the light source emits laser light, the outer peripheral portion of the transfer roller is formed of laser-transmissive material, and the photothermal conversion layer is formed of laser-absorbing material.

16. A transfer material transfer method for transferring a transfer material to a web-form transfer object by superposing, heating and pressuring the transfer material with the transfer object, the process comprising the steps of:

providing a photothermal conversion layer, which absorbs light irradiated from a light source and generates heat, at one face of a web-form support member formed of a light-transmissive flexible member;

superposing the transfer material with the photothermal conversion layer side face of the support member;

superposing the transfer object with the transfer material;

winding the transfer object superposed with the transfer material around a winding roller;

conveying the superposed and wound transfer object;

during the step of conveying, pressuring the transfer object superposed with the transfer material between the support member and the winding roller by pressuring with a pressuring structure;

during the step of pressuring, irradiating light emitted from a light source toward the photothermal conversion layer provided at the support member for heating the photothermal conversion layer in accordance with a transfer pattern; and allowing the heated photothermal conversion layer to heat the transfer material for transferring the transfer material to the transfer object.

17. The transfer material transfer method of claim 16, wherein the step of irradiating light comprises the steps of:

effecting scanning; and during the step of scanning, irradiating laser light from the light source toward the photothermal conversion layer of the support member in accordance with the transfer pattern.

18. A shape transfer method for forming recessed portions with a predetermined pattern in a surface of a web-form transfer object by heating and pressuring the transfer object, the process comprising the steps of:

providing a photothermal conversion layer, which absorbs light irradiated from a light source and generates heat, at an outer peripheral face of a transfer roller which is formed in a substantially cylindrical shape, light-transmissive material being used as a base member of an outer peripheral portion of the transfer roller;

providing a mold member, at which protruding portions corresponding to the recessed portions to be formed in the surface of the transfer object are formed, at the outer peripheral face of the transfer roller;

winding the transfer object round the transfer roller;

conveying the wound transfer object;

during the step of conveying, pressuring the transfer object between the transfer roller and a pressure roller;

during the step of pressuring, irradiating light from a light source, which is provided at an interior of the transfer roller, toward the photothermal conversion layer for heating the photothermal conversion layer and, by this heating, heating the transfer object via the protruding portions formed at the mold member; and consequent to the heating, forming the recessed portions in the transfer object in accordance with the protruding portions.

19. The shape transfer process of claim 18, wherein, the light source emits laser light, the outer peripheral portion of the transfer roller is formed of laser-transmissive material, the photothermal conversion layer is formed of laser-absorbing material, and the laser light is selectively irradiated to the protruding portions.

20. A transfer device for transferring a transfer material to a web-form transfer object in a predetermined transfer pattern by superposing, heating and pressuring the transfer material with the transfer object, the device comprising:

a transfer roller around which the transfer material and the transfer object are wound and conveyed, a base member of an outer peripheral portion of the transfer roller being formed in a cylindrical shape of a light-transmissive material which transmits light of a predetermined wavelength;

a photothermal conversion layer disposed between an outer peripheral face of the transfer roller and the transfer object that is wound around the transfer roller, the photothermal conversion layer absorbing light of the predetermined wavelength for generating heat;

a pressuring structure which applies pressure by nipping the transfer object between the pressuring structure and the transfer roller; and a light source disposed at an interior of the transfer roller, which heats the photothermal conversion layer in accordance with the transfer pattern by irradiating light of the predetermined wavelength toward the transfer object that is being pressured by the pressuring structure, for heating the transfer material.

21. The transfer device of claim 20, wherein the photothermal conversion layer is formed at the outer peripheral face of the transfer roller.

22. The transfer device of claim 20, wherein, in a case in which the light source emits laser light, the base member of the transfer roller is formed of a laser-transmissive material, and the photothermal conversion layer is formed of a laser-absorbing material.

23. The transfer device of claim 22, wherein the light source comprises a laser head provided with a plurality of emission apertures, which are respectively capable of emitting the laser light, and the laser light from the laser head can be irradiated to arbitrary positions along a direction intersecting a direction of the conveyance of the transfer object.

24. The transfer device of claim 20, wherein the pressuring structure comprises an endless pressure belt wound around a predetermined range of the transfer roller.

25. The transfer device of claim 20, further comprising a cooling structure at a peripheral vicinity of the transfer roller, which cools the heated transfer object.

26. A transfer device for forming recessed portions in a surface of a web-form transfer object by superposing, heating and pressuring a mold member with the transfer object, protruding portions of a predetermined pattern being formed at the mold member and the recessed portions being formed in accordance with the protruding portions, and the device comprising:
 a transfer roller around which the transfer object is wound and conveyed, a base member of an outer peripheral portion of the transfer roller being formed in a cylindrical shape of a light-transmissive material which transmits light of a predetermined wavelength;
 a photothermal conversion layer formed between an outer peripheral face of the transfer roller and the transfer object that is wound around the transfer roller, the photothermal conversion layer absorbing light of the predetermined wavelength for generating heat;
 a pressuring structure which applies pressure by superposing and nipping the transfer object with the mold member between the pressuring structure and the transfer roller; and
 a light source disposed at an interior of the transfer roller, which heats the photothermal conversion layer by irradiating light of the predetermined wavelength toward the transfer object that is being pressured by the pressuring structure, for heating the transfer object by heating the protruding portions of the mold member.

27. The transfer device of claim 26, wherein the mold member is formed integrally with the outer peripheral portion of the transfer roller.

28. The transfer device of claim 26, wherein the mold member is formed in web form, and is superposed with the transfer object, wound around the transfer roller and conveyed.

29. A transfer device for transferring a transfer material to a web-form transfer object in a predetermined transfer pattern by superposing, heating and pressuring the transfer material with the transfer object, the device comprising:
 a heat generation member including a photothermal conversion layer provided at one face of a support member which is formed in web form of a light-transmissive flexible member, the support member transmitting laser light of a predetermined wavelength, and the photothermal conversion layer absorbing laser light and generating heat;
a winding roller around which the transfer object is wound and conveyed, the heat generation member and the transfer material superposed with the transfer object being wound around the winding roller such that the support member side of the heat generation member is at an outer side;
 a pressuring structure which applies pressure to the transfer material and the transfer object by pressuring the heat generation member, which is wound around the winding roller, toward the winding roller; and
 a light source which heats the photothermal conversion layer in accordance with the transfer pattern, by irradiating laser light toward the heat generation member that is wound around the winding roller together with the transfer object and the transfer material, for heating the transfer material.

30. The transfer device of claim 29, wherein the light source irradiates the laser light in accordance with the transfer pattern while scanning.

31. The transfer device of claim 29 or claim 30, further comprising a cooling structure which cools an outer peripheral portion of the winding roller.

* * * * *